(12) United States Patent
Fang et al.

(10) Patent No.: US 10,996,798 B2
(45) Date of Patent: May 4, 2021

(54) TOUCH PANEL AND SHEET OF TOUCH SENSORS

(71) Applicant: TPK Glass Solutions (Xiamen) Inc., Xiamen (CN)

(72) Inventors: Wei-Chia Fang, Hsinchu (TW); Chung-Chin Hsiao, Hsinchu (TW)

(73) Assignee: TPK Glass Solutions (Xiamen) Inc., Xiamen (CN)

( * ) Notice: Subject to any disclaimer, the term of this patent is extended or adjusted under 35 U.S.C. 154(b) by 4 days.

(21) Appl. No.: 16/254,603

(22) Filed: Jan. 23, 2019

(65) Prior Publication Data
US 2019/0227650 A1 Jul. 25, 2019

(30) Foreign Application Priority Data

Jan. 24, 2018 (CN) .......................... 201810066822.8

(51) Int. Cl.
*G06F 3/044* (2006.01)
*G06F 3/041* (2006.01)

(52) U.S. Cl.
CPC ............ *G06F 3/044* (2013.01); *G06F 3/0443* (2019.05); *G06F 3/0445* (2019.05); *G06F 3/0446* (2019.05); *G06F 3/0448* (2019.05); *G06F 3/04164* (2019.05); *G06F 2203/04102* (2013.01); *G06F 2203/04103* (2013.01); *G06F 2203/04107* (2013.01)

(58) Field of Classification Search
CPC .... G06F 3/044; G06F 3/0443; G06F 3/04164; G06F 3/0445; G06F 3/0446; G06F 3/0448; G06F 2203/04107; G06F 2203/04102; G06F 2203/04103; G06F 3/0412

See application file for complete search history.

(56) References Cited

U.S. PATENT DOCUMENTS

| 9,639,219 | B2 * | 5/2017 | Ishii | ..................... G02F 1/13338 |
| 2012/0319980 | A1 * | 12/2012 | Nagaoka | .............. H05K 1/0269 345/173 |
| 2015/0169092 | A1 * | 6/2015 | Lee | ......................... G06F 3/041 345/173 |
| 2016/0246415 | A1 * | 8/2016 | Bae | .......................... G06F 3/044 |
| 2016/0299608 | A1 * | 10/2016 | Choi | ..................... G06F 3/0416 |
| 2016/0320876 | A1 * | 11/2016 | Son | .......................... G06F 3/044 |
| 2018/0095574 | A1 * | 4/2018 | Kim | ....................... G06F 3/0416 |

\* cited by examiner

*Primary Examiner* — Benyam Ketema
(74) *Attorney, Agent, or Firm* — Cooper Legal Group, LLC

(57) ABSTRACT

A touch panel includes a substrate, a plurality of peripheral traces, a plurality of marks, a touch sensing electrode, a plurality of first intermediate layers, and a plurality of second intermediate layers. The peripheral traces and the marks are disposed in a peripheral area of the substrate. The first intermediate layers are disposed between the peripheral traces and the substrate, and the second intermediate layers are disposed between the marks and the substrate. Each of the first intermediate layers and the second intermediate layers includes a metal nanowire, and the touch sensing electrode is electrically connected with the peripheral traces. A touch sensor tape is also proposed.

35 Claims, 12 Drawing Sheets

TOUCH PANEL AND SHEET OF TOUCH SENSORS

CROSS-REFERENCE TO RELATED APPLICATION

THIS APPLICATION CLAIMS PRIORITY TO CHINA APPLICATION SERIAL NUMBER 201810066822.8, FILED Jan. 24, 2018, WHICH IS HEREIN INCORPORATED BY REFERENCE.

BACKGROUND

Technology Field

This disclosure relates to a touch panel and a sheet of touch sensors.

Description of Related Art

Transparent conductive materials have high transmission and provide good electrical conductivity, making them suitable for display devices and touch sensing panels. Examples of transparent conductive materials include various metal oxides, such as indium tin oxide (ITO), indium zinc oxide (IZO), cadmium tin oxide (CTO), and aluminum-doped zinc oxide (AZO). However, these metal oxides cannot satisfy the requirement for flexible display devices. Nanowires are one example of transparent conductive materials developed for flexible display devices.

When manufacturing a touch sensing electrode, a common component in touch sensing panels, to ensure proper alignment of a nanowire layer to a metal trace layer in a peripheral area, an alignment tolerance area is included in the peripheral area. If a roll-to-roll process is used to manufacture the touch sensing electrode, the size of the alignment tolerance area may be enlarged (e.g. to 150 μm) to account for potential deformation of the substrate.

SUMMARY

In some embodiments of this disclosure, first intermediate layers, which are at least formed by metal nanowires, are provided between peripheral traces and a substrate, and second intermediate layers, which are at least formed by metal nanowires, are provided between marks and the substrate. According to this design, the conventional alignment tolerance area for the alignment process is not needed, so that the peripheral traces can have a smaller width to attain narrow/slim borders. In addition, in some embodiments of this disclosure, a novel touch sensor tape structure is also disclosed for manufacturing a new touch panel structure.

In some embodiments of this disclosure, a touch panel comprises a substrate, a plurality of peripheral traces, a plurality of marks, a plurality of first intermediate layers, a plurality of second intermediate layers, and a touch sensing electrode. The substrate has a display area and a peripheral area. The peripheral traces are disposed in the peripheral area of the substrate. The marks are disposed in the peripheral area of the substrate. The first intermediate layers are disposed between the peripheral traces and the substrate, and the second intermediate layers are disposed between the marks and the substrate. Each of the first intermediate layers and the second intermediate layers comprises a metal nanowire. The touch sensing electrode is disposed in the display area of the substrate and electrically connected with the peripheral traces.

In some embodiments of this disclosure, the touch panel further comprises a film layer covering the touch sensing electrode, the peripheral traces, and the marks.

In some embodiments of this disclosure, the touch panel further comprises first and second non-conductive areas disposed in the display area and the peripheral area, respectively.

In some embodiments of this disclosure, the first and second non-conductive area comprises a filler made of the same material of the film layer.

In some embodiments of this disclosure, the second non-conductive area is defined between adjacent peripheral traces. Each of the peripheral traces has a side wall and a lower surface, and each of the first intermediate layers has a side surface. The side surface and the side wall are contacted with the filler. The first intermediate layer contacts the lower surface of the corresponding peripheral trace, and is formed between the lower surface of the corresponding peripheral trace and the substrate.

In some embodiments of this disclosure, the second non-conductive area is defined between adjacent marks of the plurality of marks. Each of the marks has a side wall and a lower surface, each of the second intermediate layers has a side surface. The side surfaces and the side walls are all contacted with the filler. The second intermediate layers is formed between the lower surface of the a corresponding mark and the substrate, and the second intermediate layers contact the lower surfaces of the marks.

In some embodiments of this disclosure, the first intermediate layers and the second intermediate layers are a composite structure comprising the metal nanowires and a film layer.

In some embodiments of this disclosure, the touch panel further comprises non-conductive areas disposed in both the display area and the peripheral area, respectively.

In some embodiments of this disclosure, the non-conductive area comprises a filler at least made of the same material of the film layer, and the filler does not contains the metal nanowires embedded. In other words, the concentration of the nanowires in the filler is zero.

In some embodiments of this disclosure, the touch panel further comprises a protective layer covering the touch sensing electrode, the peripheral traces and the marks.

In some embodiments of this disclosure, the side walls of the peripheral traces are contacted with the protective layer, and the composite structure of the first intermediate layer is formed between the lower surface of the corresponding peripheral trace and the substrate, and the composite structure contacts the lower surface of the corresponding peripheral trace.

In some embodiments of this disclosure, the side walls of the marks are contacted with the protective layer, and the side surface is contacted with the filler. The composite structure of the second intermediate layer is formed between the lower surface of a corresponding mark and the substrate, and the composite structure contacts the lower surface of the corresponding peripheral trace.

In some embodiments of this disclosure, the mark comprises a bonding alignment mark.

In some embodiments of this disclosure, a width of the peripheral traces is about 5 μm to 20 μm, and a distance between adjacent peripheral traces is about 5 μm to 20 μm.

In some embodiments of this disclosure, the peripheral traces and the marks are made of metal materials, and the touch sensing electrode comprises the metal nanowires or a composite structure containing a film layer and the metal nanowires.

In some embodiments of this disclosure, a sheet of touch sensors comprises a substrate, a plurality of marks, and a plurality of second intermediate layers. A plurality of touch panels is disposed on the substrate, and each touch panel comprises a plurality of peripheral traces, a plurality of first intermediate layers, and a touch sensing electrode. The peripheral traces are disposed in a peripheral area of the substrate. The first intermediate layers are disposed between the peripheral traces and the substrate. The touch sensing electrode is disposed in a display area and is electrically connected with the peripheral traces. The marks are disposed on the substrate. The second intermediate layers are disposed between the marks and the substrate. The first intermediate layers and the second intermediate layers comprise metal nanowires. In other words, the first intermediate layers and the second intermediate layers are metal nanowire layer.

In some embodiments of this disclosure, the sheet further comprises a film layer covering the touch sensing electrode, the peripheral traces, and the marks.

In some embodiments of this disclosure, the touch sensor tape further comprises first and second non-conductive areas disposed in the display area and the peripheral area, respectively.

In some embodiments of this disclosure, the first or second non-conductive area comprises a filler made of the same material of the film layer.

In some embodiments of this disclosure, each of the peripheral traces has a side wall and a lower surface, each of the first intermediate layers has a side surface, the side surfaces and the side walls are all contacted with the filler, and the first intermediate layer contacts the lower surface of the corresponding peripheral trace.

In some embodiments of this disclosure, the marks comprise plurality of bonding alignment marks disposed in the peripheral area, and the bonding alignment mark has a side wall and a lower surface. The second non-conductive area is defined between adjacent bonding alignment marks. Each of the second intermediate layers has a side surface, the side surfaces and the side wall are contacted with the filler. The second intermediate layer contacts the lower surface of the corresponding bonding alignment mark, and the second intermediate layer is formed between the lower surface of the corresponding bonding alignment mark and the substrate.

In some embodiments of this disclosure, the marks comprise a cutting alignment mark disposed between adjacent touch panels or an alignment mark, a direction mark, a scale mark, or a number/letter mark disposed on the substrate. Each of the marks has a side wall and a lower surface, and each of the second intermediate layers has a side surface. The side surfaces and the side walls are contacted with the filler. The second intermediate layer is formed between the lower surface of a corresponding mark and the substrate, and the second intermediate layer contacts the lower surface of the corresponding mark.

In some embodiments of this disclosure, the first intermediate layers and the second intermediate layers are a composite structure comprising the metal nanowire and a film layer.

In some embodiments of this disclosure, the sheet further comprises non-conductive areas disposed in both of the display area and the peripheral area.

In some embodiments of this disclosure, the non-conductive area comprises at least a filler at least made of the same material of the film layer, and the filler does not contain the metal nanowires.

In some embodiments of this disclosure, the sheet further comprises a protective layer covering the touch sensing electrode, the peripheral traces and the marks.

In some embodiments of this disclosure, each of the peripheral traces has a side wall and a lower surface, the side wall is contacted with the protective layer, and the composite structure of the first intermediate layer contacts the lower surface of the corresponding peripheral trace, and is formed between the lower surface of a corresponding peripheral trace and the substrate.

In some embodiments of this disclosure, the marks comprise bonding alignment marks disposed in the peripheral area of each of the touch panel. The second non-conductive area is defined between adjacent bonding alignment marks. The connection alignment mark has a side wall and a lower surface, the side wall contacts the protective layer. The composite structure of the second intermediate layer is formed between the lower surface of a corresponding bonding alignment mark and the substrate, and the composite structure contacts the lower surface of the corresponding connection alignment mark.

In some embodiments of this disclosure, the marks comprise a cutting alignment mark disposed between adjacent t touch panels or an alignment mark, a direction mark, a scale mark, or a number/letter mark disposed on the substrate. Each of the marks has a side wall and a lower surface, and the side wall of the mark contacts the protective layer. The composite structure of the second intermediate layer is formed between the lower surface of a corresponding mark and the substrate, and the composite structure contacts the lower surface of the corresponding mark.

In some embodiments of this disclosure, a width of the peripheral traces is about 3 µm, 5 µm, 8 µm, 10 µm, 15 µm, 20 µm, and a distance between adjacent two of the peripheral traces is 3 µm, 5 µm, 8 µm, 10 µm, 15 µm, 20 µm.

In some embodiments of this disclosure, the peripheral traces and the marks are made of metal materials, and the touch sensing electrode comprises the metal nanowire or a composite structure containing a film layer and the metal nanowires.

DETAILED DESCRIPTION OF THE DISCLOSURE

Figure 1:
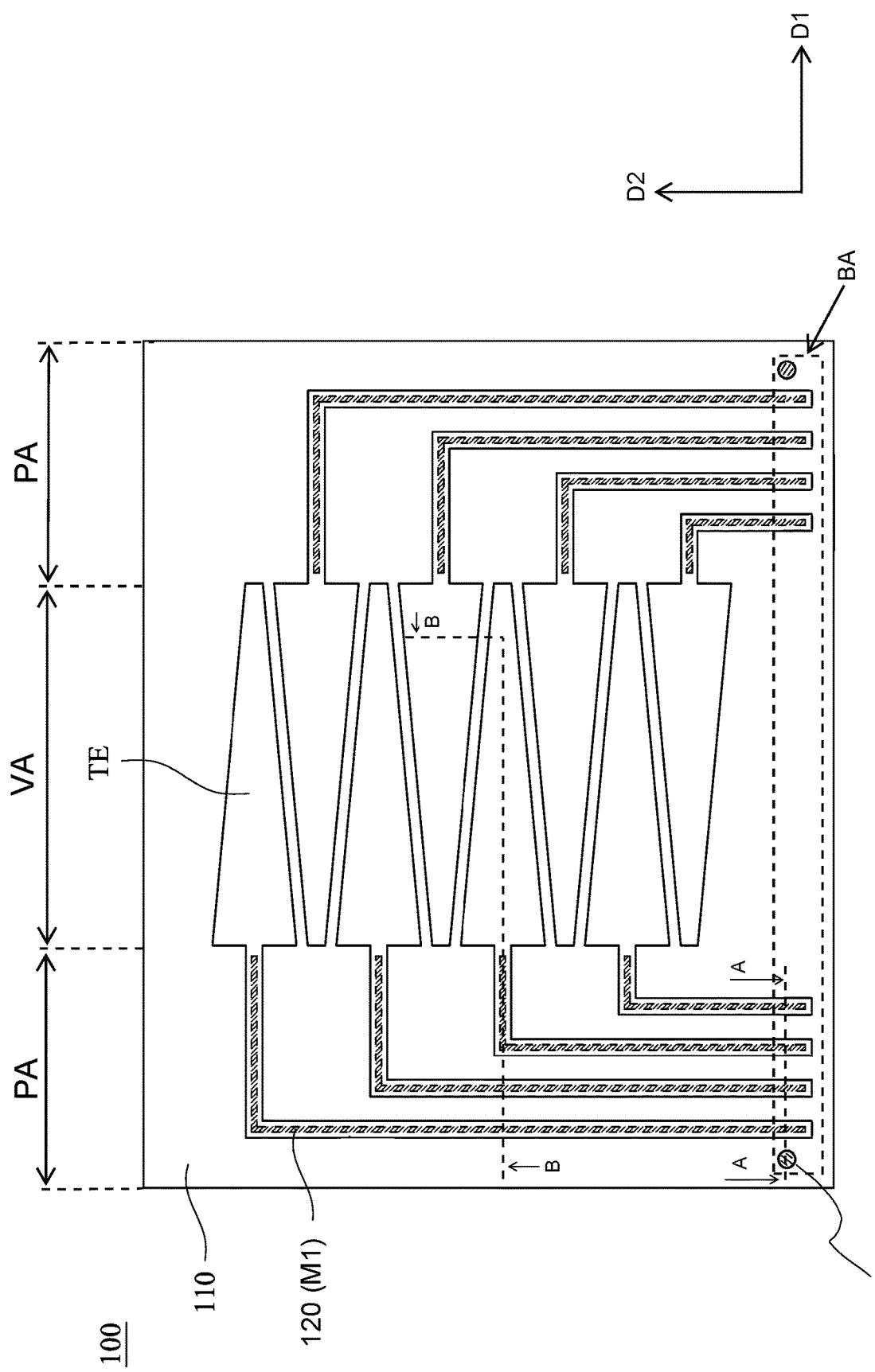
FIG. 1 is a top view of a touch panel according to some embodiments of this disclosure.

In the following, several embodiments of the present disclosure will be disclosed with reference to the drawings, and for the sake of clarity, many practical details will be described in the following description. However, it should be understood that these practical details are not used to limit the present disclosure. That is, in some embodiments of the present disclosure, these practical details are not essential. Moreover, for the purpose of streamlining the drawings, some of the well-known and commonly used structures and components are shown in the drawings in a simplified schematic manner.

With regard to "about" or "approximately as used in this disclosure, the error or range of the value is generally within 20 percent, preferably within 10 percent, and more preferably within 5 percent. In the absence of a clear statement in the disclosure, the values mentioned are all considered to be approximate values. That is, the values mentioned have a deviation or range represented by "about" or "approximately".

FIG. 1 is a top view of a touch panel 100 according to an exemplary embodiment of this disclosure. The touch panel 100 comprises a substrate 110, at least one peripheral trace 120, at least one mark 140, at least one first intermediate layer M1, at least one second intermediate layer M2, and at least one touch sensing electrode TE. In this embodiment, the number of the peripheral traces 120, the marks 140, the first intermediate layers M1, the second intermediate layers M2, and the touch sensing electrodes TE can be one or more. The numbers thereof in the following embodiments and drawings are for illustrations only and are not for limiting this disclosure. Referring to FIG. 1, the substrate 110 has a display area VA and a peripheral area PA. The peripheral area PA is disposed at side(s) of the display area VA. For example, the peripheral area PA is disposed in a frame region around the display area VA (including the top side, the bottom side, the right side and the left side). In other embodiments, the peripheral area PA is disposed in an L-shape region including the left side and the bottom side of the display area VA. As shown in FIG. 1, this embodiment provides eight sets of the peripheral traces 120 and eight sets of the first intermediate layers M1 corresponding to the peripheral traces 120. The peripheral traces 120 and the first intermediate layers M1 are disposed within the peripheral area PA of the substrate 110. The touch sensing electrodes TE are disposed in the display area VA of the substrate 110 and electrically connected with the peripheral traces 120. Moreover, two sets of the marks 140 and two sets of the second intermediate layers M2 corresponding to the marks 140 are disposed in the peripheral area PA of the substrate 110. The first intermediate layer M1 is disposed between a corresponding peripheral trace 120 and the substrate 110, and the second intermediate layer M2 is disposed between a corresponding mark 140 and the substrate 110. Accordingly, the two layers, e.g., first intermediate layer M1 and peripheral trace 120, or second intermediate layer M2 and mark 140 can be disposed at the predetermined positions for forming as a stackup without the alignment procedure. This configuration can reduce or avoid the requirement for disposing the alignment tolerance area during the manufacturing process, thereby decreasing the width of the peripheral area PA to achieve the narrow border design or ultra-narrow border design of the display device.

Specifically, in some embodiments of this disclosure, the peripheral traces 120 and the marks 140 can be made of metal materials with good conductivity, which is a single layer conductive structure such as a silver layer or a copper layer, or a multilayer conductive structure such as Mo/Al/Mo, Cu/Ni, Cu/Al/Ti, or Mo/Co. The above-mentioned metal structure may be oblique or nontransparent (e.g. having a light transmission less than 90% (visible light, about 400 nm-700 nm)). Each of the first intermediate layer M1 and the second intermediate layer M2 may be a metal nanowire layer at least containing metal nanowires, such as a silver nanowire layer, a gold nanowire layer, or a copper nanowire layer. In more specific, the term "metal nanowires" is a group of metal wires containing multiple pure metals, metal alloys, or metal compounds (including metal oxides). The amount of the metal nanowires contained in the metal nanowire layer is not limited to the scope of this disclosure. At least a cross-section size (i.e., the diameter of the cross-section) of a single metal nanowire is less than 500 nm, preferably less than 100 nm, and more preferably less than 50 nm. In this disclosure, the metal nanostructure, which is named as a wire, mainly has a high aspect ratio (e.g. about 10-100,000). In more detailed, the aspect ratio (length of the nanowire to diameter of cross-section of the nanowire) of the metal nanowire is greater than about 10, preferably greater than about 50, and more preferably greater than about 100. The metal nanowires can be made of any metal such as, including but not limited to, silver, gold, copper, nickel and silver plated gold. Other terms, such as silk, fiber or tube having the above-mentioned size or high aspect ratio, should be considered as within the scope of this disclosure.

In this embodiment, the touch sensing electrodes TE are disposed in the display area VA and are electrically connected with the peripheral traces 120. In more detailed, the touch sensing electrodes TE can also be a metal nanowire layer at least containing the metal nanowires. In other words, the metal nanowire layer has at least two portions. The first portion of the metal nanowire layer is formed in the display area VA, and the second portion of the metal nanowire layer is formed in the peripheral area PA. The first portion can be processed (i.e., be patterned) to form the touch sensing electrodes TE in the display area VA, and the second portion can be processed (i.e., be patterned) to form the first intermediate layers M1 or second intermediate layers M2 in the peripheral area PA. Accordingly, the touch sensing electrodes TE can electrically connect to the peripheral traces 120 as the first intermediate layers M1 contact the peripheral traces 120 for performing the signal transmission. In addition, the metal nanowires can be processed in one or more step to form the first intermediate layers M1 and the second intermediate layers M2 in the peripheral layer PA. The second intermediate layers M2 are located between the marks 140 and the substrate 110. The marks 140 can be understood as patterns/structures without electrical function of transmitting signals, but not limited thereto. In some embodiments of this disclosure, the peripheral traces 120 and the marks 140 can be made of the same metal layer (e.g., the peripheral traces 120 and the marks 140 are made of the same metal material), and the touch sensing electrodes TE, the first intermediate layers M1 and the second intermediate layers M2 can be made of the same metal nanowire layer.

Figure 1A:
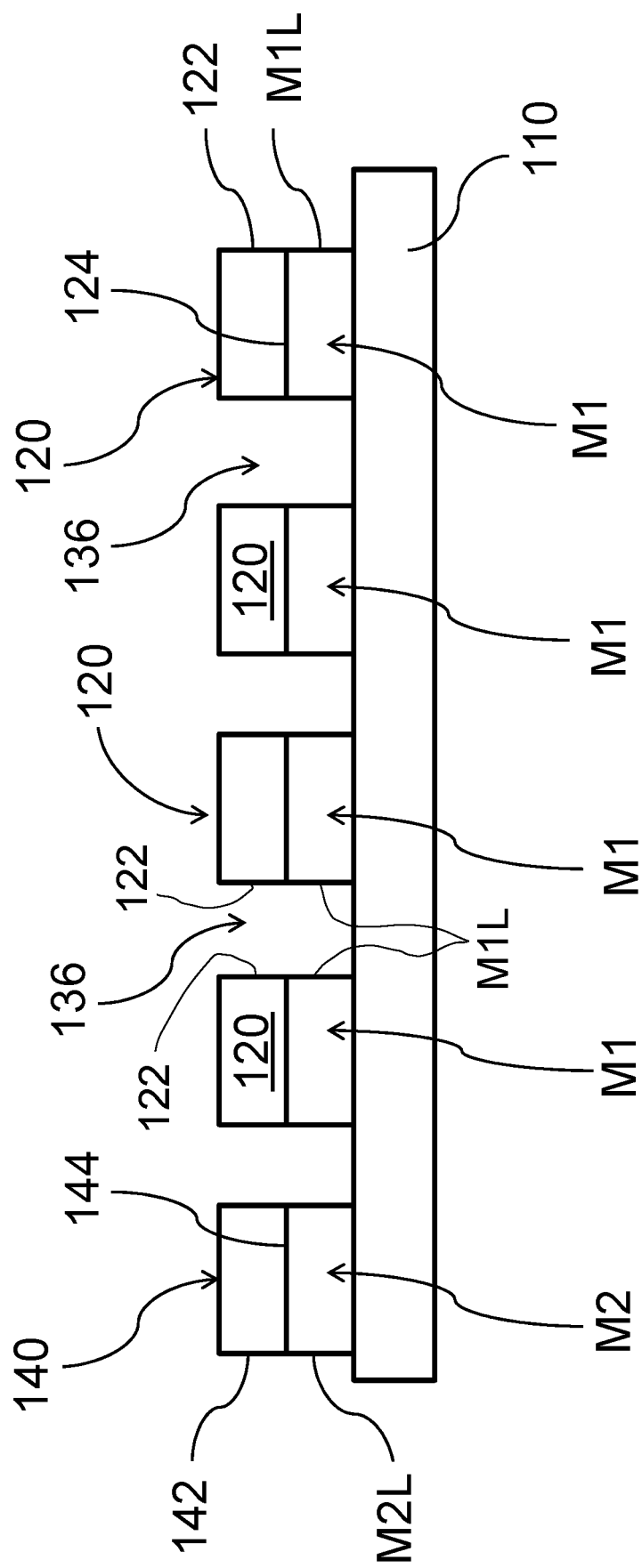
FIG. 1A is a cross-sectional view of FIG. 1 along the line A-A.
Figure 1B:
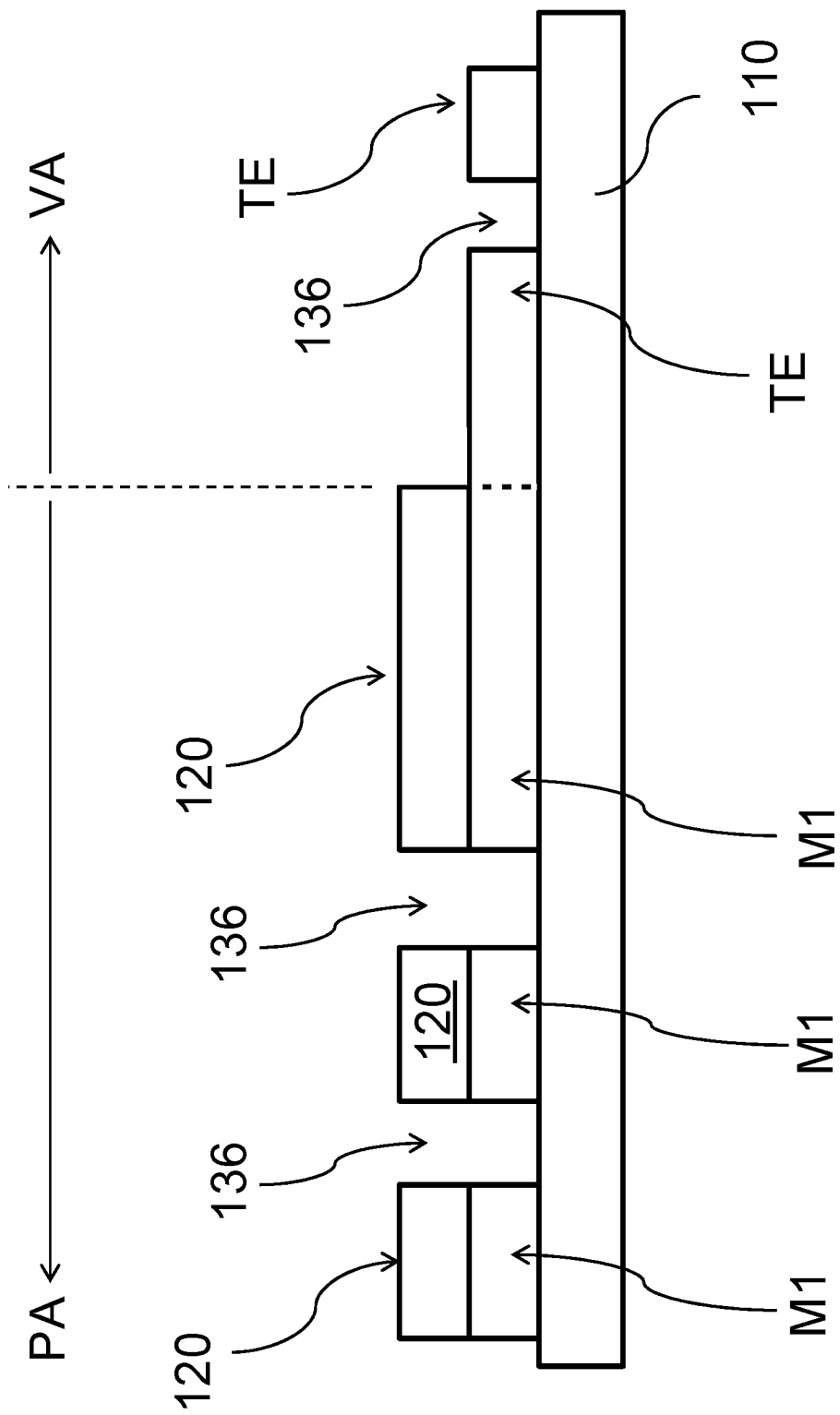
FIG. 1B is a cross-sectional view of FIG. 1 along the line B-B.

FIG. 1A is a cross-sectional view of FIG. 1 along the line A-A, and FIG. 1B is a cross-sectional view of FIG. 1 along the line B-B. Referring to FIG. 1A, each of the first intermediate layers M1 is formed by the above-mentioned metal nanowire layer and contacts on the lower surface 124 of the corresponding peripheral trace 120, and the first intermediate layer M1 is located between the lower surface 124 and the substrate 110. In addition, each of the second intermediate layer M2 is formed by the above-mentioned metal nanowire and contacts the lower surface 144 of the corresponding mark 140, and the second intermediate layer M2 is located between the lower surface 144 and the substrate 110. In some embodiments of this disclosure, the metal nanowires can be silver nanowires. For simplification, the cross-sections of the peripheral traces 120 and the marks 140 are drawn as a quadrilateral (i.e., rectangles in FIG. 1A). To be noted, the structures or amounts of the side walls 122 and the lower surfaces 124 of the peripheral traces 120 and the side walls 142 and the lower surfaces 144 of the marks 140 can be modified based on the actual applications, and are not limited to the descriptions and drawings of this disclosure.

In this embodiment, the marks 140 are disposed in the bonding area BA of the peripheral area PA (as shown in FIG. 1), and the marks 140 can be bonding alignment marks. In other words, when attaching an external circuit board (e.g. the flexible circuit board 170) to the touch panel 100 (e.g., a bonding step), the marks 140 are provided for aligning the flexible circuit board 170 to the touch panel 100, as provided in FIG. 2. However, the positions or functions of the marks 140 are not limited in this disclosure. For example, the marks 140 can also be applied as marks, patterns or labels for visual inspection or in any manufacturing process, and they are all within the scope of this disclosure. The marks 140 can have any desired shape such as circle, rectangle, cross, L-shape, T-shape, or the likes. In addition, portions of the peripheral traces 120 extending to the bonding area BA are also defined as bonding sections/bonding pads. As mentioned above, the lower surface of the bonding sections/bonding pads in the bonding area BA are also configured with the first intermediate layers M1. In other words, the first intermediate layer M1 is formed between the lower surface of the bonding section and the substrate.

As shown in FIGS. 1A and 1B, in the peripheral area PA, a non-conductive area 136 is formed between adjacent peripheral traces 120 for electrically isolating the adjacent peripheral traces 120 and preventing the short circuit from each other. In detail, a non-conductive area 136 is formed between the side walls 122 of adjacent peripheral traces 120 and the side surfaces M1L of adjacent first intermediate layers M1. In this embodiment, the non-conductive area 136 is a gap/space for isolating the adjacent peripheral traces 120 or/and the adjacent first intermediate layers M1. In practice, when forming the first intermediate layers M1 and the peripheral traces 120, the gap can be also formed by an etch process. Thus, the side wall 122 of the peripheral trace 120 and the side surface M1L of the corresponding first intermediate layer M1 have a common etching surface or a co-planar etching surface. In other words, the side walls 122 of the peripheral traces 120 and the side surfaces M1L of the first intermediate layers M1 are formed in the same etching process of one etchant. Alternatively, it is also possible to form the side walls 122 of the peripheral traces 120 by a first etching step of one etchant and then to form the side surfaces M1L of the first intermediate layers M1 by a second etching step of another etchant. Similarly, the side walls 142 of the marks 140 and the side surfaces M2L of the second intermediate layers M2 can also be formed by the above-mentioned method. In one embodiment, the metal nanowires can be removed from the side walls 122 of the peripheral traces 120 and the side walls 142 of the marks 140 by the above-mentioned etch process. In addition, the peripheral traces 120 and the first intermediate layers M1 can have the same or similar patterns or sizes. For example, they can be straight-line patterns with the same or similar widths. Furthermore, the marks 140 and the second intermediate layers M2 can also have the same or similar patterns or sizes. For example, they can be circles with the same or similar diameter, rectangles with the same or similar lengths, or other same or similar patterns (e.g. crosses, L-shapes, or T-shapes). In the bonding area BA of FIG. 1A, the non-conductive area 136 is also configured between adjacent bonding sections, and the side walls 122 of the bonding sections and the side surfaces M1L of the first intermediate layers M1 can be referred to the above forming methods/structures.

As shown in FIG. 1B, in the display area VA, the non-conductive area 136 is configured between adjacent touch sensing electrodes TE for electrically isolating the adjacent touch sensing electrodes TE and preventing the short circuit from each other. In other words, a non-conductive area 136 is formed between the side walls of two adjacent touch sensing electrodes TE. In this embodiment, the non-conductive area 136 is a gap/space for isolating the adjacent touch sensing electrodes TE. In one embodiment, the gap between the adjacent touch sensing electrodes TE can be formed by the above-mentioned etch process. In this embodiment, the touch sensing electrodes TE and the first intermediate layers M1/second intermediate layers M2 can be made of the same metal nanowire layer (e.g. a silver nanowire layer). Thus, the portion of the metal nanowire layer in the display area VA can be processed (i.e., etched) to form the touch sensing electrodes TE in the display area VA, and the portion of the metal nanowire layer in the peripheral area PA can be processed (i.e., etched) to form the first intermediate layers M1 or/and second intermediate layers M2 in the peripheral area PA. The connection structures between the touch sensing electrodes TE and the first intermediate layers M1 are formed near the boundary of the display area VA and the peripheral area PA, so that the touch sensing electrodes TE and the peripheral traces 120 can form a conductive circuit for signal-transmission.

In some embodiments of this disclosure, the first intermediate layers M1 and the second intermediate layers M2 of the touch panel 100 are disposed on the lower surfaces 122 of the peripheral traces 120 and the lower surfaces 144 of the marks 140, respectively. This configuration can reduce or avoid the requirement of the alignment tolerance area during the manufacturing process (i.e., the alignment step), thereby decreasing the width of the peripheral area PA to achieve the narrow border/slim border or ultra-slim border design of the display device. In more detailed, in some embodiments of this disclosure, the width of the peripheral trace 120 of the touch panel 100 is about 5 μm-20 μm, and the distance (i.e., the width of the non-conductive area 136) between adjacent peripheral traces 120 is about 5 μm-20 μm. Preferably, the width of the peripheral trace 120 of the touch panel 100 is about 3 μm-20 μm, and the distance between two adjacent peripheral traces 120 is about 3 μm-20 μm. Accordingly, the width of the peripheral area PA (i.e., the width of the border of touch panel 100) can be 2 mm or smaller. Comparing to the conventional touch panel, the border of the touch panel of the embodiment is reduced as 80% or less of peripheral area of the conventional touch panel.

Figure 2:
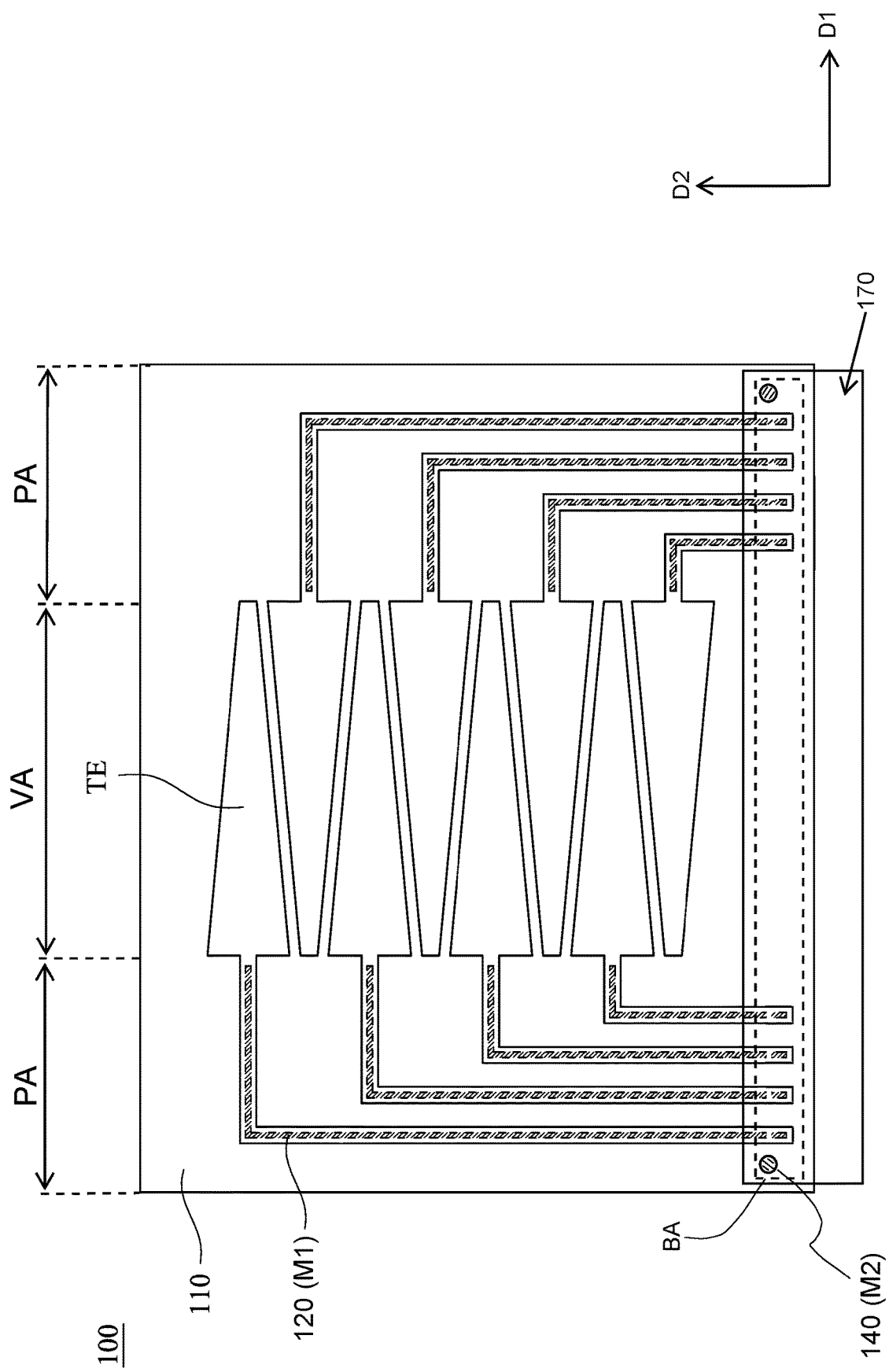
FIG. 2 is a top view of a touch panel assembled with a flexible circuit board according to some embodiments of this disclosure.

FIG. 2 shows the assembled structure of the touch panel 100 and a flexible circuit board 170 after alignment and bonding steps. Herein, the electrode pads (not shown) of the flexible circuit board 170 are electrically connected with the peripheral traces 120 of the bonding area BA on the substrate 110 by the conductive adhesive (not shown, such as an anisotropic conductive adhesive glue) or via-hole structures. In some embodiments of this disclosure, the peripheral traces 120 can directly contact the electrode pads of the flexible circuit board 170 by welding so as to form the conductive circuit for signal transmission. In this embodiment, the touch sensing electrodes TE are in a non-interlaced/non-cross arrangement. For example, the touch sensing electrodes TE are stripe electrodes extending along the first direction D1 and are not interlaced with each other, and there is no intersection formed by the touch sensing electrodes TE. In other embodiments, the touch sensing electrodes TE can have any desired shape and are not limited to this embodiment. In this embodiment, the touch sensing electrodes TE has a single layer configuration, and the touch position can be obtained by detecting the self-capacitance changes of the touch sensing electrodes TE individually.

Figure 3A:
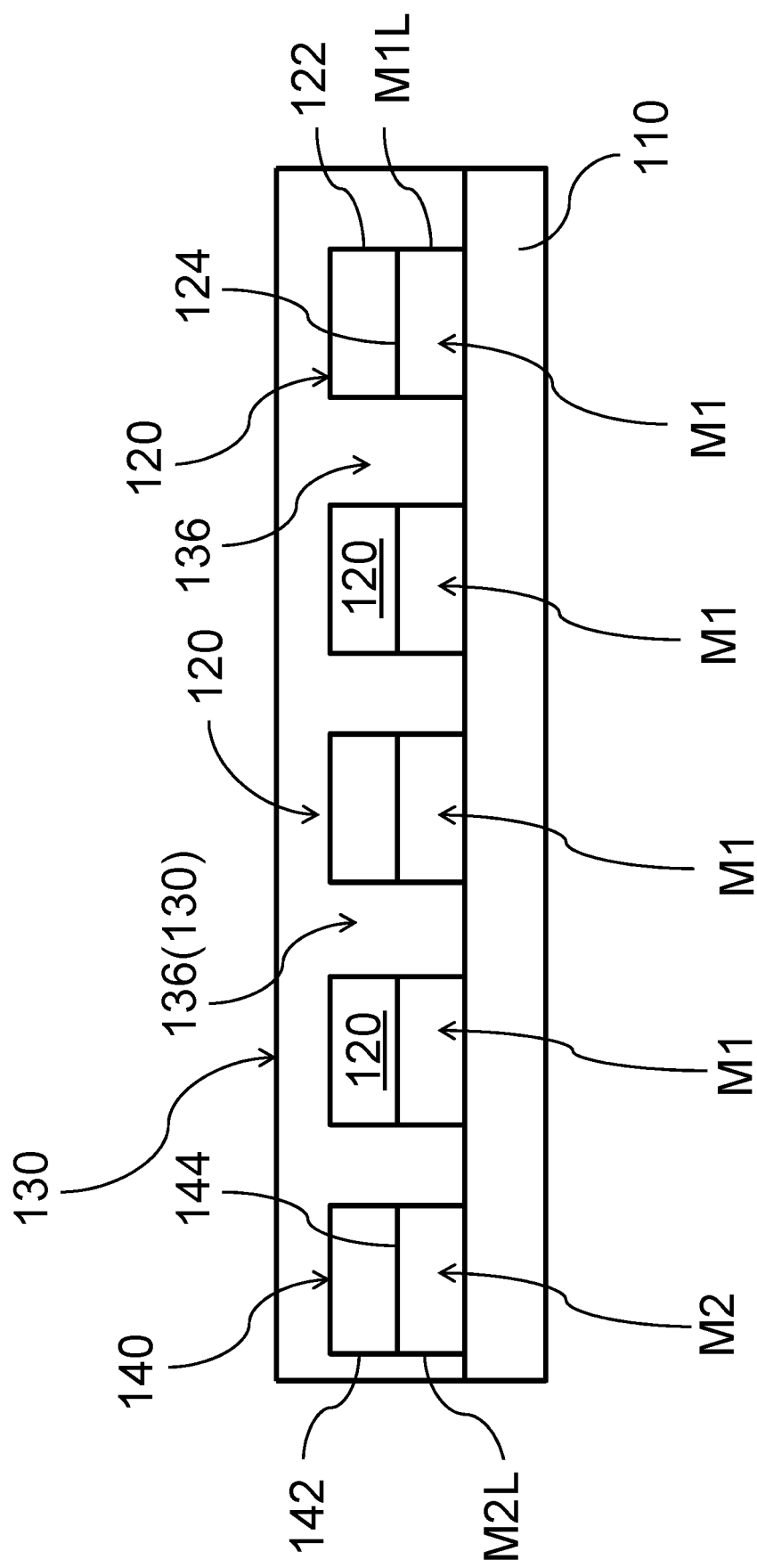
FIG. 3A is a cross-sectional view of a modified embodiment of FIG. 1 along the line A-A.
Figure 3B:
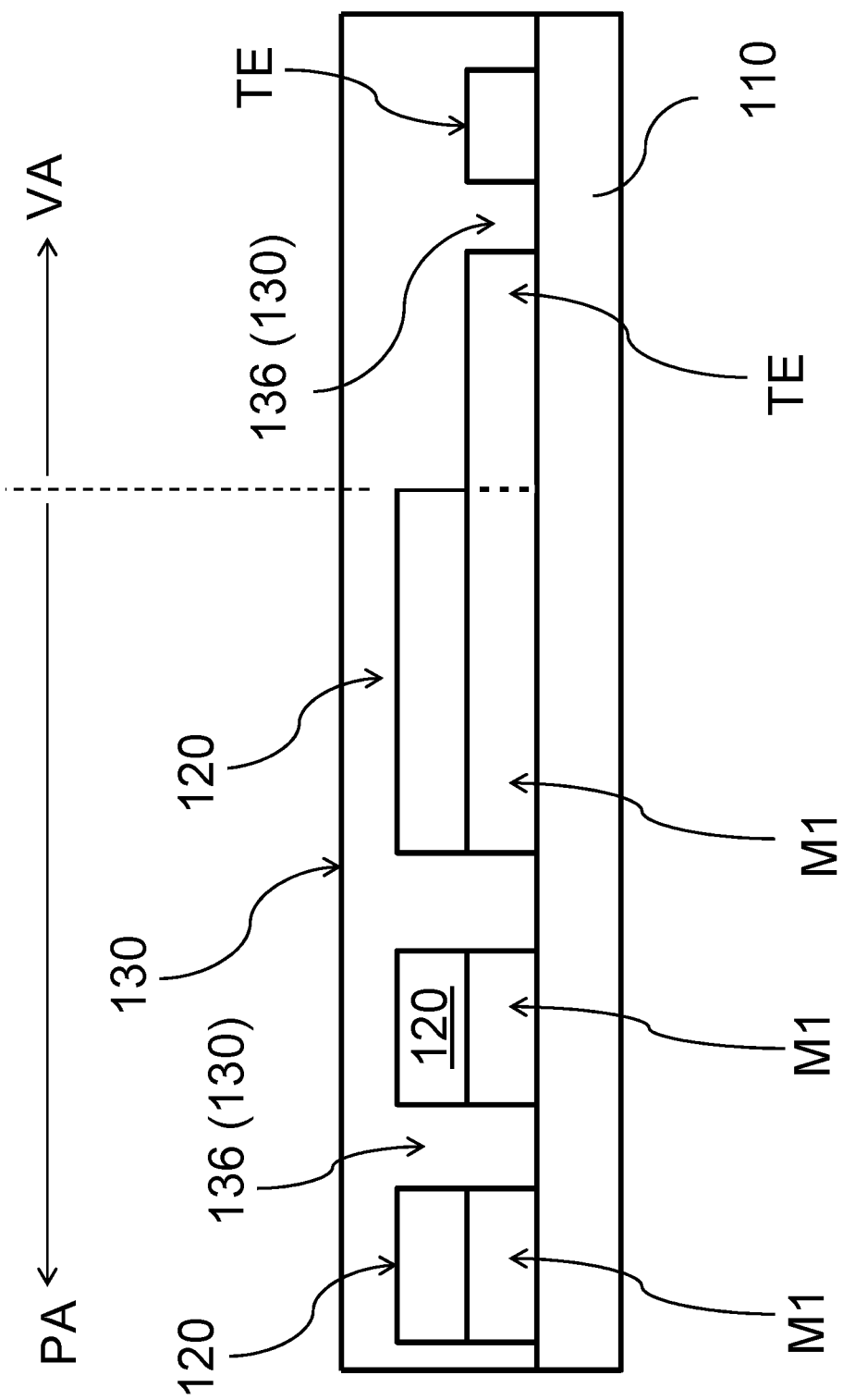
FIG. 3B is a cross-sectional view of a modified embodiment of FIG. 1 along the line B-B.

In one embodiment, the touch panel 100 further comprises a film layer 130. FIGS. 3A and 3B are cross-sectional views of FIG. 1 along the line A-A and the line B-B, which show the structure after forming the film layer 130. In one embodiment, the film layer 130 entirely covers the touch panel 100. In other words, all the touch sensing electrodes TE, the peripheral traces 120 and the marks 140 are covered by the film layer 130. As shown in FIGS. 3A and 3B, in the peripheral area PA, the film layer 130 covers the peripheral traces 120 and the marks 140. Moreover, the film layer 130 further fills in the non-conductive areas 136 between the adjacent peripheral traces 120 to form filler. That is, the filler, which has the same material as the film layer 130, is disposed in the non-conductive areas 136 and the filler also can perform as insulators for isolating the adjacent peripheral traces 120. In addition, regarding a set of the peripheral trace 120 and the corresponding first intermediate layer M1, the film layer 130 surrounds the set of the peripheral trace 120 and the corresponding first intermediate layer M1. In more specific, the film layer 130 covers and contacts the upper surface of the peripheral trace 120, the side wall 122 of the peripheral trace 120, and the side surface M1L of the first intermediate layer M1. That is, each peripheral trace 120 has a side wall 122 and a lower surface 124, each first intermediate layer M1 has a side surface M1L, and the side surface M1L and the side wall 122 are aligned with each other to form the co-planar etching surface, and both of side surface M1L and the side wall 122 contact the filler (i.e., the film layer 130). Besides, the first intermediate layer M1 contacts the lower surface 124 of the corresponding peripheral trace 120, and the first intermediate layer M1 is located between the lower surface 124 of the corresponding peripheral trace 120 and top surface of the substrate 110. Similarly, regarding a set of the mark 140 and the corresponding second intermediate layer M2, the film layer 130 surrounds the set of the mark 140 and the corresponding second intermediate layer M2. In more specific, the film layer 130 covers and contacts the upper surface of the mark 140, the side wall 142 of the mark 140, and the side surface M2L of the second intermediate layer M2. That is, each mark 140 has a side wall 142 and a lower surface 144, each second intermediate layer M2 has a side surface M2L, and the side surface M2L and the side wall 142 are aligned with each other to form the co-planar etching surface, and both of side wall 142 and side surface M2L contact the filler (or the film layer 130). Besides, each second intermediate layer M2 contacts the lower surface 144 of the corresponding mark 140, and the second intermediate layer M2 is located between the lower surface 144 of the corresponding mark 140 and top surface of the substrate 110.

As shown in FIG. 3B, in the display area VA, the film layer 130 covers the touch sensing electrodes TE, and fills in the non-conductive areas 136 between adjacent touch sensing electrodes TE to form fillers. That is, the filler, which has the same material as the film layer 130, is disposed in the non-conductive areas 136 between the adjacent touch sensing electrodes TE and the filler also can perform as insulators for isolating the adjacent touch sensing electrodes TE.

In this embodiment, the touch sensing electrodes TE and the film layer 130 in the display area VA form a composite structure, and the composite structure preferably has electrical conductivity and light permeability. For example, the composite structure has a light transmission greater than about 80% (for visible light, about 400 nm-700 nm of wavelength) and a surface resistance ranging from about 10 to 1000 ohm/square. Preferably, the composite structure has a light transmission greater than about 85% and a surface resistance ranging from about 50 to 500 ohm/square.

In some embodiments of this disclosure, the film layer 130 may be made of polyethylene (PE), polypropylene (PP), polyvinyl butyral (PVB), polycarbonate (PC), acrylonitrile butadiene styrene (ABS), PEDOT, PSS, ceramic material, or the likes. In one embodiment of this disclosure, the film layer 130 may be made of, for example but not limited to, the following polymers including polyacrylic resins such as polymethacrylates (e.g. poly(methyl methacrylate)), polyacrylates, and polyacrylonitrile; polyvinyl alcohol; polyesters (e.g. polyethylene terephthalate (PET), polyester naphthalate and polycarbonate); polymers with high aromaticity such as phenolic resins or cresol-formaldehyde, polystyrene, polyvinyltoluene, polyvinylxylene, polyamide imines, polyamides, polyamideimides, polyetherimides, polysulfides, polysulfones, polyphenylenes and polyphenyl ethers; polyurethanes (PU); epoxy resins; polyolefins (e.g. polypropylene, polymethylpentene and cycloolefins); cellulose; polysilicone and other silicon-containing polymers (e.g. polysilsesquioxanes and polysilanes); polyvinyl chloride (PVC); polyacetate; polynorbornene; synthetic rubber (e.g. ethylene-propylene rubber (EPR), styrene-butadiene rubber (SBR), ethylene-propylene-diene monomer (EPDM); fluoropolymers (e.g. polyvinylidene fluoride, polytetrafluoroethylene (TFE) or polyhexafluoropropylene); and copolymers of fluoro-olefins and hydrocarbon olefins, or the likes. In other embodiments, the film layer 130 can be made of inorganic materials such as silica, mullite, alumina, SiC, carbon fiber, MgO—$Al_2O_3$—$SiO_2$, $Al_2O_3$—$SiO_2$ or MgO—$Al_2O_3$—$SiO_2$—$Li_2O$.

Figure 4A:
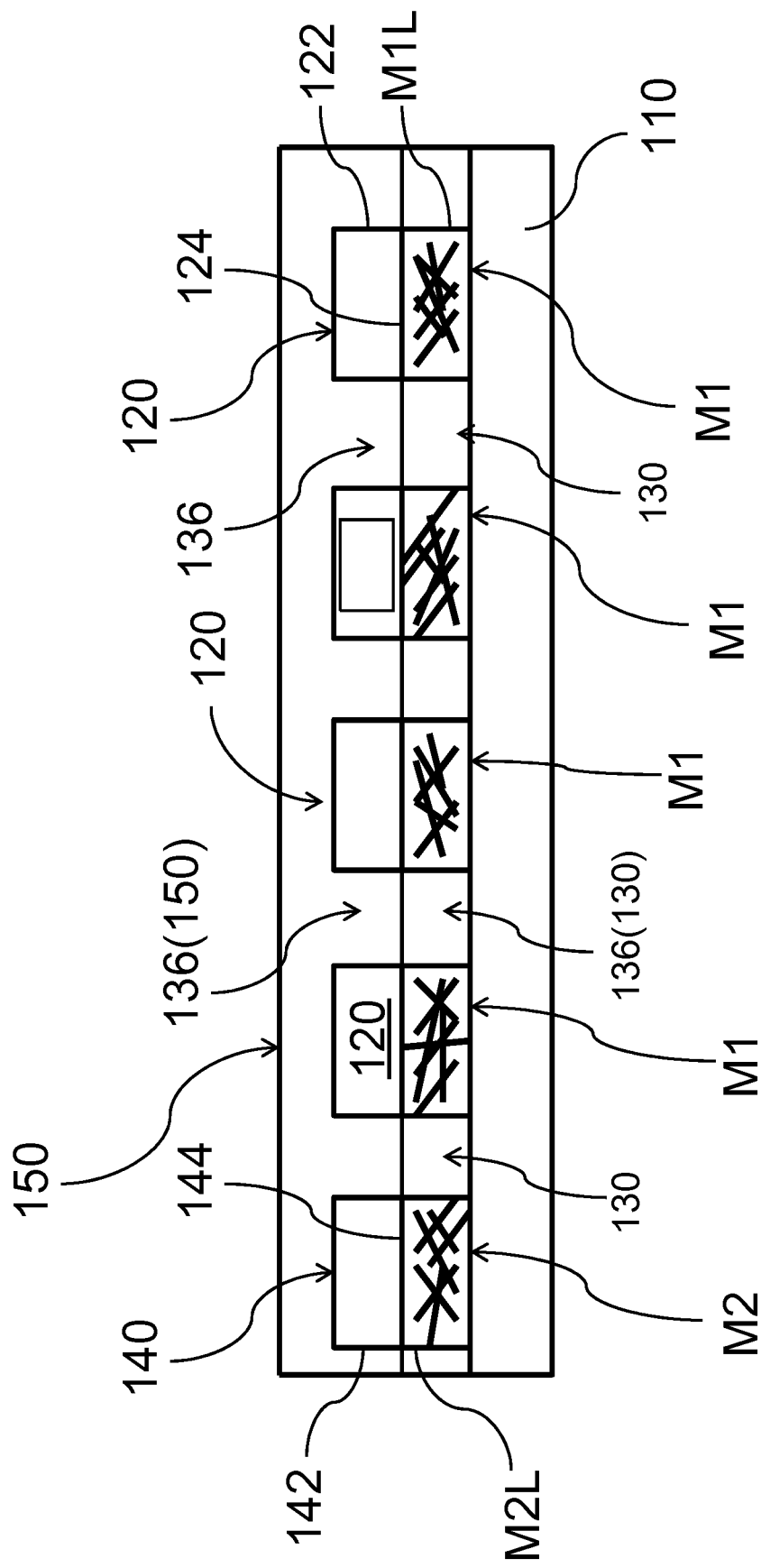
FIG. 4A is a cross-sectional view of another modified embodiment of FIG. 1 along the line A-A.
Figure 4B:
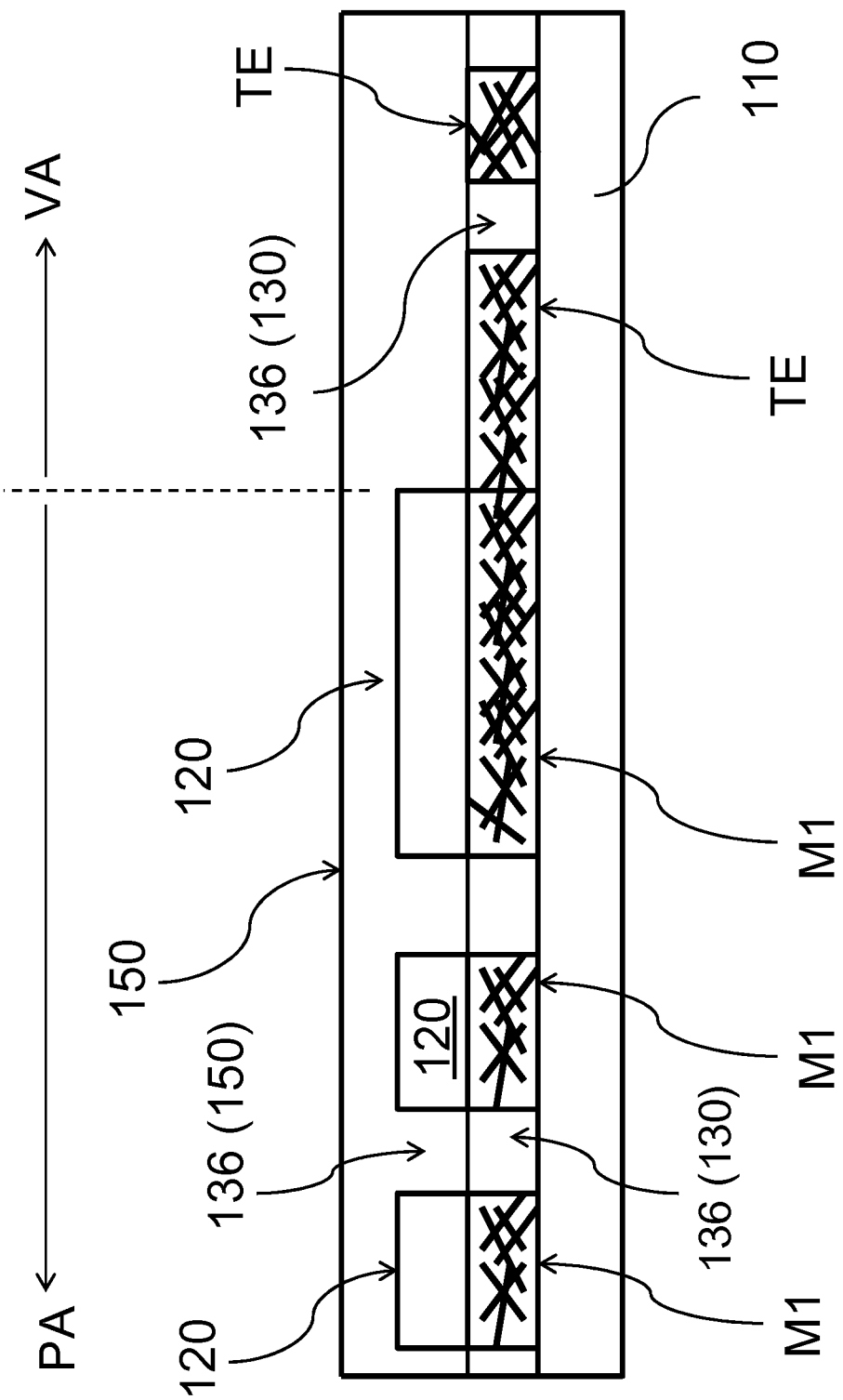
FIG. 4B is a cross-sectional view of another modified embodiment of FIG. 1 along the line B-B.

In one embodiment, the touch panel 100 further comprises a film layer 130 and a protective layer 150. FIGS. 4A and 4B are cross-sectional views of FIG. 1 along the line A-A and the line B-B, which show the structure after forming the film layer 130 and the protective layer 150. To be noted, the film layer 130 and the protective layer 150 are optionally used in this disclosure, and this disclosure is not limited to the following embodiments. The material of the protective layer 150 can be referred to the experimental material of the film layer 130. In one embodiment, each of the first intermediate layers M1 and the second intermediate layers M2 is a composite structure containing the metal nanowires and the film layer 130, and the protective layer 150 totally covers the touch panel 100. In other words, the protective layer 150 covers the touch sensing electrodes TE, the peripheral traces 120 and the marks 140.

As shown in FIGS. 4A and 4B, in the peripheral area PA, each of the first intermediate layers M1 is a composite structure containing the metal nanowires (e.g. silver nanowires) and the film layer 130, and each of the second intermediate layers M2 is a composite structure as well as the first intermediate layer M1. The film layer 130 fills in the non-conductive areas 136 between the adjacent first intermediate layers M1 as a filler, as described above. In this embodiment, the filler is located in the first section (e.g. the lower section) of non-conductive areas 136. In the peripheral area PA, the protective layer 150 covers the peripheral traces 120 and the marks 140, and fills in the second section (e.g. the upper section) of the non-conductive areas 136 between the adjacent peripheral traces 120. In this embodiment, the filler, which has the same material as the film layer 130, is disposed in the non-conductive areas 136 between the adjacent peripheral traces 120, and the filler does not contain the metal nanowire (the concentration of the metal nanowires is 0). An extending portion of the protective layer 150 is formed on the filler in the non-conductive areas 136. This configuration of extending portion of the protective layer 150 and the filler may perform as an insulator to isolate the adjacent peripheral traces 120. In one embodiment, the non-conductive area 136 is filled with a first filler made of the same material as the film layer 130 and a second filler made of the same material as the protective layer 150. In addition, regarding a set of the peripheral trace 120 and the corresponding first intermediate layer M1, the film layer 130 and the protective layer 150 surround the set of the peripheral trace 120 and the corresponding first intermediate layer M1. In more specific, the two-layer structure of the film layer 130 and the protective layer 150 covers and contacts the upper surface of the peripheral trace 120, the side wall 122 of the peripheral trace 120, and the side surface M1L of the first intermediate layer M1. That is, each peripheral trace 120 has an upper surface, a side wall 122 and a lower surface 124, each first intermediate layer M1 has a side surface M1L, and the side surface M1L and the side wall 122 are aligned with each other to form the co-planar etching surface. The side surface M1L contacts the film layer 130 (i.e., the first filler). The upper surface of peripheral trace 120 contacts the the protective layer 150, and the side wall 122 contacts the protective layer 150 (i.e., the second filler). The first intermediate layer M1 contacts the lower surface 124 of the corresponding peripheral trace 120, and the first intermediate layer M1 is located between the lower surface 124 of the corresponding peripheral trace 120 and top surface of the substrate 110.

Similarly, regarding a set of the mark 140 and the corresponding second intermediate layer M2, the film layer 130 and the protective layer 150 surround the set of the mark 140 and the corresponding second intermediate layer M2. In more specific, the two-layer structure of the film layer 130 and the protective layer 150 covers and contacts the upper surface of the mark 140, the side wall 142 of the mark 140, and the side surface M2L of the second intermediate layer M2. That is, each mark 140 has an upper surface, a side wall 142 and a lower surface 144, each second intermediate layer M2 has a side surface M2L, and the side surface M2L and the side wall 142 are aligned with each other to form the co-planar etching surface. The side surface M2L contacts the film layer 130 (i.e., the first filler). The upper surface of the mark 140 contacts the protective layer 150, and the side wall 142 contacts the protective layer 150 (i.e., the second filler). The second intermediate layer M2 contacts the lower surface 144 of the corresponding mark 140, and the second intermediate layer M2 is located between the lower surface 144 of the corresponding mark 140 and top surface of the substrate 110. In one embodiment, the first filler around the first intermediate layer M1 is integrally formed with the film layer 130 in the composite structure of the first intermediate layer M1. In other words, the first filler and the film layer 130 in the composite structure of the first intermediate layer M1 are formed by the same polymer/resin layer. Similarly, the first filler around the second intermediate layer M2 is integrally formed with the film layer 130 in the composite structure of the second intermediate layer M2. In other words, the first filler and the film layer 130 in the composite structure of the second intermediate layer M2 are formed by the same polymer/resin layer. In an embodiment, the first fillers, the film layer 130 of the first intermediate layer M1 and the film layer 130 of the second intermediate layer M2 are integrally formed. In other words, the first fillers, the film layer 130 of the first intermediate layer M1 and the film layer 130 of the second intermediate layer M2 are formed by the same polymer/resin layer.

As shown in FIG. 4B, in the display area VA, the protective layer 150 covers the touch sensing electrodes TE, and each touch sensing electrode TE comprises the composite structure including the metal nanowires and the film layer 130. The film layer 130 further fills in the non-conductive areas 136 between adjacent touch sensing electrodes TE. In other words, a filler, which has the same material as the film layer 130, is disposed in the non-conductive areas 136 between the adjacent touch sensing electrodes TE, and the filler does not contain the metal nanowire. This configuration that the filler without metal nanowire performs as an insulator can isolate the adjacent touch sensing electrodes TE. In one embodiment, the filler around the touch sensing electrodes TE is integrally formed with the film layer 130 in the composite structure of the touch sensing electrodes TE. In other words, the filler and the film layer 130 of the touch sensing electrodes TE are formed by the same polymer/resin layer. In an embodiment, the first fillers in the peripheral area PA, the film layer 130 of the first intermediate layer M1, the film layer 130 of the second intermediate layer M2, the fillers in the display area VA, and the film layer 130 of the touch sensing electrodes TE are integrally formed. In other words, the first fillers in the peripheral area PA, the film layer 130 of the first intermediate layer M1, the film layer 130 of the second intermediate layer M2, the fillers in the display area VA, and the film layer 130 of the touch sensing electrodes TE are formed by the same polymer/resin layer.

In addition, the film layer 130 and the metal nanowires can form a composite structure for providing specific chemical, mechanical or optical properties for the desired characteristics of the first intermediate layers M1, the second intermediate layers M2 or the touch sensing electrodes TE. For example, the composite structure can provide for the adhesive property between the first intermediate layers M1 and the substrate 110, and between the second intermediate layers M2 and the substrate 110, or for the physical mechanical strength of layers. In some embodiments, the film layer 130 can also be named as a matrix. In some embodiments, the film layer 130 can be made of some specific polymers, so that the first intermediate layers M1 and the second intermediate layers M2 can have an additional surface protection (e.g. anti-scratching or anti-wearing). In this case, the film layer 130 can be named as a hard coat. For example, the first intermediate layers M1 or the second intermediate layers M2, which includes film layer 130 made of polyacrylates, epoxy resins, polyurethanes, polysilanes, polysiloxane, or poly(silicone-acrylic), can have a higher surface strength for enhancing the anti-scratching ability. Moreover, the film layer 130 can be further added with the UV stabilizers for increasing the anti-UV ability of the first intermediate layers M1, the second intermediate layers M2 or the touch sensing electrodes TE. However, the above-mentioned aspects are only for illustrating the possibility of adding the additional functions or different names of the film layer 130, and this disclosure is not limited thereto. To be noted, in an embodiment, before the film layer 130 is cured or when the film layer 130 is in a pre-cured state, it can penetrate between the metal nanowires to form the filling material. After the polymer is cured, the metal nanowires may be embedded or submerged into the film layer 130. In other words, the structure of the film layer 130 and the metal nanowire layer are not limited in this disclosure; for example, the metal nanowire layer and the film layer 130 may have a boundary interface, or the two layers are combined as a composite structure.

In one embodiment, in the peripheral area PA and the display area VA, the filler in the non-conductive area 136 can be embedded with the metal nanowires, but the concentration of the metal nanowires in the filler within the non-conductive area 136 is lower than a percolation threshold. In general, the electrical conductivity of the composite structure containing the film layer 130 and the metal nanowires may be controlled at least by the following factors: (a) the electrical conductivity of a single metal nanowire, (b) the number of the metal nanowires, and (c) the connecting configuration (contact level) of the metal nanowires. If the concentration of the metal nanowires is lower than the percolation threshold, the distance between the metal nanowires in the film layer 130 is too long to make effective connection between the nanowires so that the overall electrical conductivity of the composite structure will be very low or be zero so as to define the non-conductive area 136. That is, the metal nanowires cannot provide for a continuous current path, so that the conductive network of the nanowires is not available. In other words, the metal nanowires in the non-conductive area 136 will form a non-conductive network. To be noted, when the non-conductive area 136 is filled with polymer having the low-concentration metal nanowires, the non-conductive area 136 can have similar optical properties with the conductive area of the composite structures, comparing to the polymer without nanowire inside. For example, the non-conductive area 136 and the conductive area (e.g., the composite structure of the touch sensing electrodes TE) in the display area VA have similar light refractive indexes. Accordingly, when the user watches the image shown on the display device through the touch panel, the display device performs uniform optical output. In other words, the user may not easily view the boundary between the non-conductive area 136 and the conductive area, in particular, for the products having a wide distance/pitch between the touch sensing electrodes TE (e.g., the non-conductive area 136 is considered as a wide area). In one embodiment, when the sheet resistance of one area or one structure is higher than $10^8$ ohm/square, and preferably higher than $10^4$ ohm/square, 3000 ohm/square, 1000 ohm/square 350 ohm/square, or 100 ohm/square, this area or structure will be considered as an insulation part.

Figure 5:
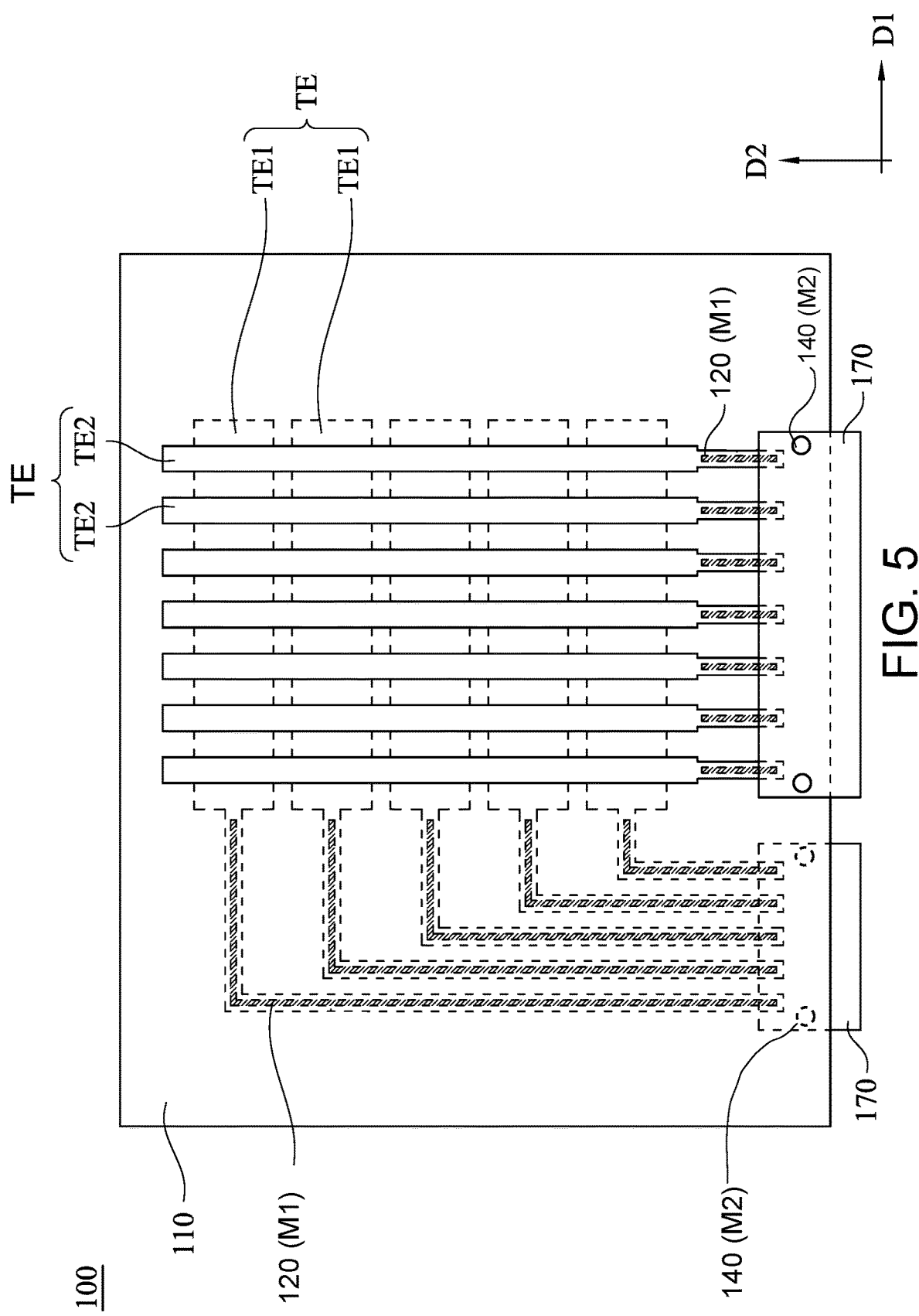
FIG. 5 is a top view of a touch panel according to another embodiment of this disclosure.

FIG. 5 is a top view of a touch panel 100 according to some embodiments of this disclosure. The embodiment of FIG. 5 is similar to the embodiment of FIG. 1. Different from the embodiment of FIG. 1, the touch sensing electrodes TE of the embodiment of FIG. 5 have a dual-layer structure.

To make the following descriptions more clear, the configuration of the first touch electrodes TE1 and the second touch electrodes TE2 will be described hereinafter. The first touch electrodes TE1 are formed on a surface (e.g. the bottom surface) of the substrate 110, and the second touch electrodes TE2 are formed on the other surface (e.g. the upper surface) of the substrate 110. Thus, the first touch electrodes TE1 are electrically isolated with the second touch electrodes TE2. The peripheral traces 120 connecting with the first touch electrodes TE1, the first intermediate layers M1 disposed on the lower surface of the peripheral traces 120, and the second intermediate layers M2 disposed on the lower surface of the marks 140 are formed on the bottom surface of the substrate corresponding to the first touch electrodes TE1. Similarly, the peripheral traces 120 connecting with the second touch electrodes TE2, the first intermediate layers M1 disposed on the lower surface of the peripheral traces 120, and the second intermediate layers M2 disposed on the lower surface of the marks 140 are formed on the upper surface of the substrate corresponding to the second touch electrodes TE2. The first touch electrodes TE1 are stripe-type electrodes extending along the first direction D1, and the second touch electrodes TE2 are stripe-type electrodes extending along the second direction D2. The extending directions of the first touch electrodes TE1 and the second touch electrodes TE2 are different and are interlaced. The first touch electrodes TE1 and the second touch electrodes TE2 are configured for transmitting control signals and receiving touch sensing signals, respectively. Accordingly, the touch position can be obtained by detecting the signal changes (e.g. capacitance changes) between the first touch electrodes TE1 and the second touch electrodes TE2. Thus, the user can perform the touch control or gesture control on the substrate 110 according to the above configuration.

The touch panel 100 of this embodiment can further comprise a film layer 130 and/or a protective layer 150 for totally covering the touch panel 100. In other words, the upper and lower surfaces of the substrate 110 are both configured with the film layer 130 and/or the protective layer 150 so that the film layer 130 and/or the protective layer 150 covers the first touch electrodes TE1, the second touch electrodes TE2, the peripheral traces 120, and the marks 140 on either the upper or lower surfaces of the substrate 110. As similar with the above embodiments, the first intermediate layer M1 and the second intermediate layer M2 are disposed on the lower surfaces of the peripheral trace 120 and the mark 140, respectively so as to achieve slim-border design of devices.

Figure 6:
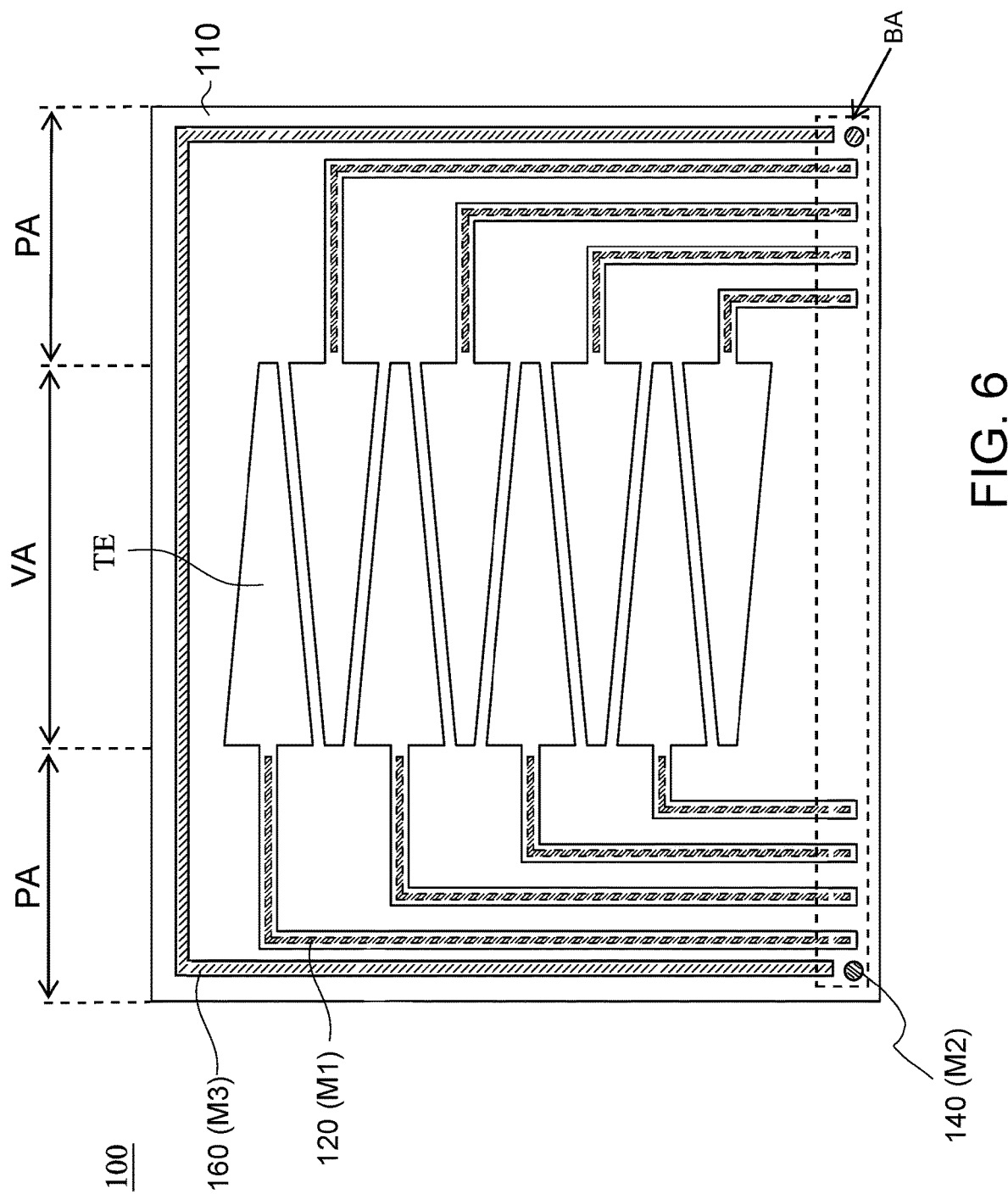
FIG. 6 is a top view of a touch panel according to another embodiment of this disclosure.

FIG. 6 is a top view of a touch panel 100 according to some embodiments of this disclosure. The embodiment of FIG. 6 is similar to the embodiment of FIG. 1. The touch panel 100 in FIG. 6 has at least the following difference from the embodiment of FIG. 1. The touch panel 100 in FIG. 6 comprises a shielding wire 160 disposed in the peripheral area PA, and a third intermediate layer M3 is formed on the lower surface of the shielding wire 160 and located between the shielding wire 160 and the substrate 110. The shielding wire 160 substantially surrounds the touch sensing electrodes TE and the peripheral traces 120, and the shielding wire 160 preferably extends to the bonding area BA and is electrically connected to the ground of the flexible circuit board 170. Accordingly, the shielding wire 160 can block or shielding the signal interference or provide for the electrostatic discharge (ESD) protection, in particular for the small current variation induced by a human while touching the metal compartment or connection wires of the electronic devices.

The shielding wire 160 is made of a metal material, and preferably can be referred to the material/structure descriptions about the peripheral traces 120 or the marks 140. The third intermediate layer M3 is a layer made of metal nanowires or is a composite structure/layer made of metal nanowires and the film layer 130. Preferably, the third intermediate layer M3 can be referred to the material/structure descriptions of the first intermediate layer M1 or the second intermediate layer M2, and the detailed descriptions of the above-mentioned embodiments can refer to the shielding wire 160 and the third intermediate layer M3 of this embodiment. In some embodiments of this disclosure, the shielding wire 160, the peripheral traces 120 and the marks 140 can be made of the same metal layer (i.e., the three components are made of the same metal material). The touch sensing electrodes TE, the third intermediate layers M3, the first intermediate layers M1, and the second intermediate layers M2 are made of the same metal nanowire layer (e.g. a silver nanowire layer), or a composite structure containing the same metal nanowire layer (e.g. a silver nanowire layer) and the film layer 130. The touch panel 100 of this embodiment further comprises a film layer 130 and/or a protective layer 150 for totally covering the touch panel 100. In other words, the film layer 130 and/or the protective layer 150 not only covers the touch sensing electrodes TE, the peripheral traces 120, and the marks 140, but also covers the shielding wire 160. In addition, the non-conductive area 136 between the shielding wire 160 and the outmost peripheral traces 120 may be filled with a single-layer filler (i.e., the film layer 130, as shown in FIG. 3B), or filled with a two-layer filler (i.e., the combination of the film layer 130 and the protective layer 150, as shown in FIG. 4A). Alternatively, the non-conductive area 136 between the shielding wire 160 and the outmost peripheral traces 120 may be filled with a two-layer filler of the film layer 130 and the protective layer 150, and the film layer 130 in the non-conductive area 136 includes low-concentration metal nanowires (i.e., lower than a percolation threshold). In an embodiment, the touch panel 100 may have shielding wire 160 formed on the upper and bottom surfaces of the substrate 110.

Figure 7:
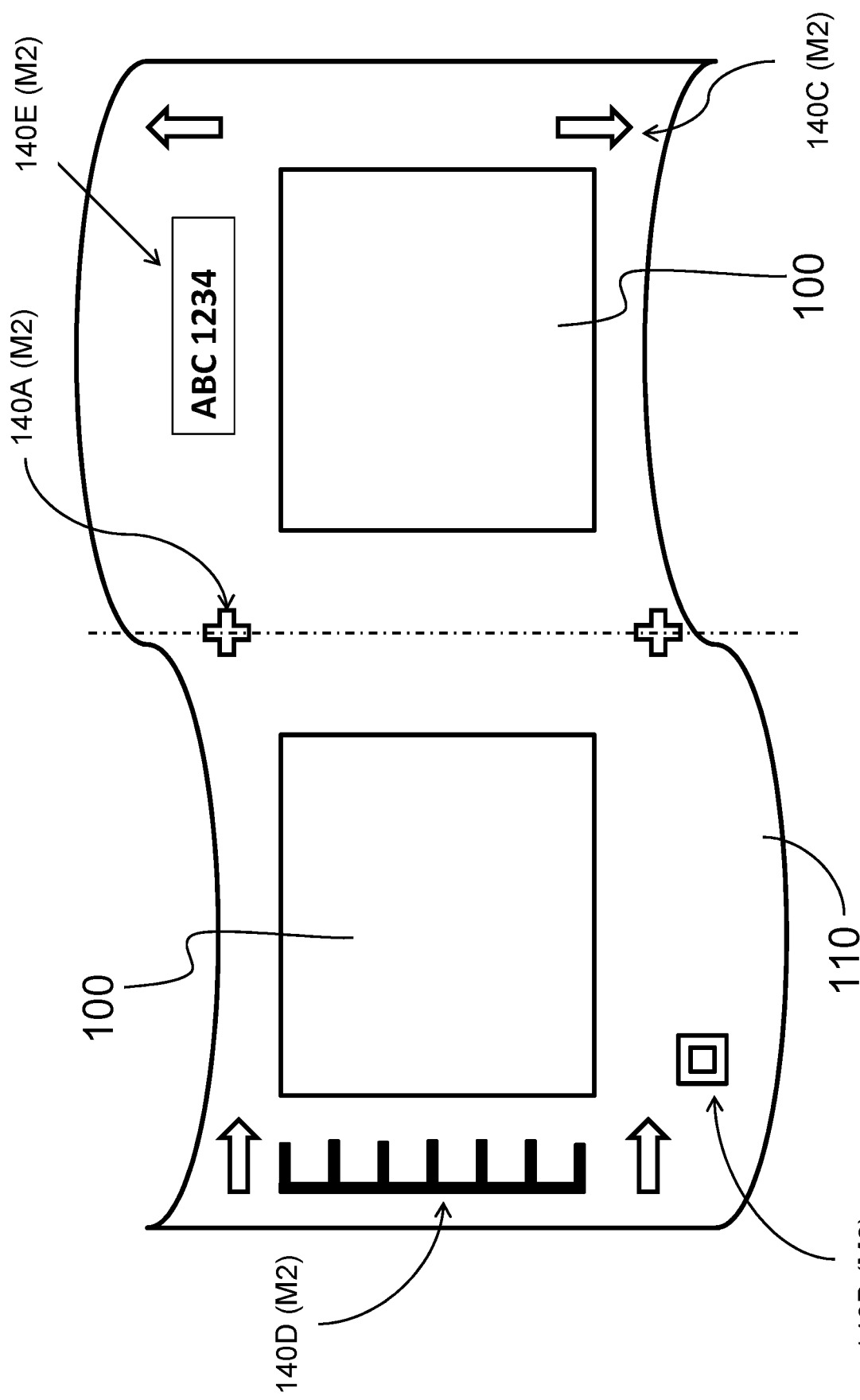
FIG. 7 is a schematic diagram of a touch sensor tape according to an embodiment of this disclosure.

In some embodiments, the touch panel 100 of this disclosure is manufactured by a roll to roll process, which can be performed automatically by the commercial machines/working stations. Thus, the manufacturing cost of the touch panel 100 can be obviously decreased. The roll to roll process at least comprises the following steps. Firstly, a flexible substrate 110 is preferably selected, and the substrate 110 is rolled as a rolled row-material sheet, which is installed between two rollers. The rollers are driven by a motor, so that a continuous process can be applied to the substrate 110 along a traveling path between two rolling rollers. Next, a storage tank, a spray device, coating device or the likes can be used to deposit the ink containing the metal nanowires on the surface of the substrate 110 so as to form the metal nanowire layer. Afterwards, the spray head outputs the polymer on the surface of the substrate 110, and then the polymer is solidified/cured and also patterned to form the film layer 130. Finally, the roller disposed at the end of the production line can wrap/roll the flexible substrate 110 to form the rolled sheet of touch sensors. The sheet of touch sensors may be separated to form individual touch panels by a cutting process. As shown in FIG. 7, in the manufactured sheet having touch sensors thereon, the surface of the substrate 110 is configured with a plurality of touch panels 100, and the surface of the substrate 110 can be also configured with marks 140. Each touch panel 100 comprises peripheral traces 120 disposed in peripheral area PA, and touch sensing electrodes TE in the display area VA. The first intermediate layers M1 each is disposed between the corresponding peripheral trace 120 and the substrate 110.

The non-conductive area 136 (also called as first non-conductive area) disposed in the display area VA is defined between adjacent touch sensing electrodes TE or is defined as an area surrounding the touch sensing electrodes TE. Similarly, the non-conductive areas 136 (also called as first non-conductive area) disposed in the peripheral area PA is defined between adjacent peripheral traces 120 or is defined as an area surrounding the. peripheral trace 120 As shown in FIGS. 3B and 4B, the first non-conductive area 136 disposed in the display area VA is filled with a filler made of the same material of the film layer 130. The second non-conductive area 136 disposed in the peripheral area PA is filled with a filler made of the same material of the film layer 130 (as shown in FIG. 3A), or is filled with a two-layer filler of the film layer 130 and the protective layer 150 (as shown in FIG. 4A). Furthermore, the filler (i.e., the film layer 130 in first or second non-conductive area 136) optionally contains nanowires with concentration lower than a percolation threshold.

In this embodiment, the marks 140 may be the cutting alignment marks 140A disposed between the touch panels 100. The cutting alignment marks 140A are mainly used to assist the cutting step for obtaining individual touch panels 100 from the sheet. In view of FIG. 7, the cutting lines defined based on the cutting alignment marks 140A on the substrate 110 is used to cut and form the individual touch panels 100 after cutting along the cutting lines. In addition, the marks 140 can also be the alignment marks 140B, the direction marks 140C, the scale marks 140D, or the number/letter marks 140E. For example, the alignment marks 140B are used to align objects, the direction marks 140C are used to mark the process direction (e.g. the MD/ED direction of the substrate 110), the scale marks 140D are used to mark the scale/size, and the number/letter marks 140E are used to form the patterns of commercial logos or symbols. In other words, the marks 140 of this embodiment comprise the cutting alignment marks 140A, which are formed between the adjacent touch panels 100 on the touch sensor tape, or other marks 140B-140E. Moreover, as described above, the marks 140 may further comprise the bonding alignment marks disposed in the peripheral area PA of the touch panel 100, or other marks for other manufacturing processes. In an embodiment, the marks 140 refer to the patterns/symbols which are auxiliary structures without or with electrical functions. Referring to the above embodiments, the marks 140A-140E of this embodiment can be made of metal materials, and the second intermediate layers M2 are formed on the lower surface of the marks 140A-140E. The detailed descriptions thereof can be referred to the above embodiment. The details of the touch panel 100 of this embodiment can also be referred to the above embodiments, so the description thereof will be omitted.

The second non-conductive area 136 is also defined between adjacent marks, or defined as an area surrounding the marks 140. For example, the second non-conductive area 136 may be defined as the area surrounding each mark 140A-140E. In other words, the non-conductive area 136 is an area in which the material is removed in a patterning step.

Figure 8:
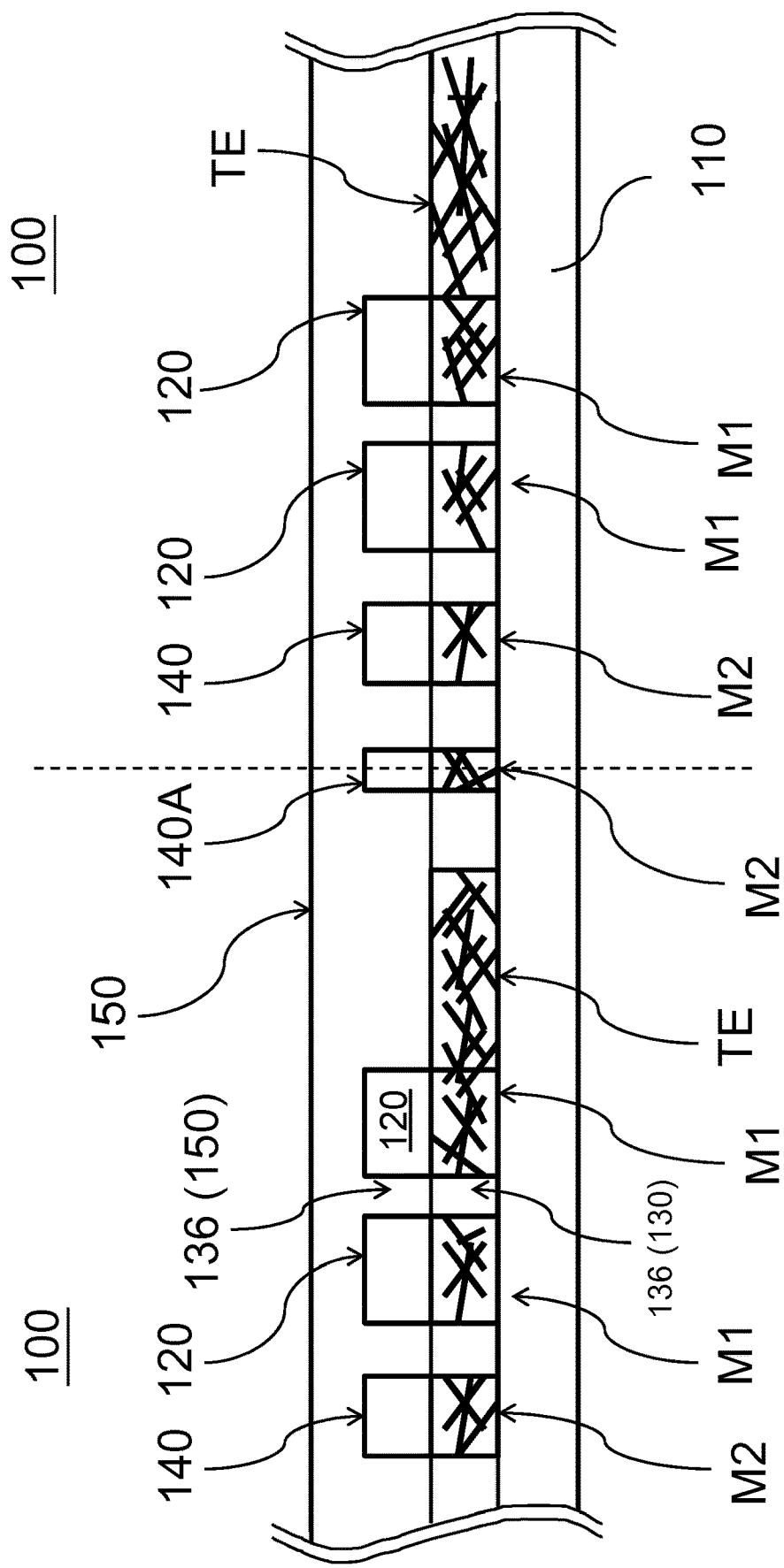
FIG. 8 is a cross-sectional view of a touch sensor tape according to an embodiment of this disclosure.

The sheet of this embodiment further comprises a film layer 130 and/or a protective layer 150 for totally covering the uncut touch panels 100 on the sheet. In other words, the film layer 130 and/or the protective layer 150 covers a plurality of touch panels 100 of the sheet. Referring to FIG. 8, the sheet of this embodiment further comprises a film layer 130 and a protective layer 150. In more specific, Each mark of the touch panel 100 (e.g. the bonding alignment mark disposed in the peripheral area PA) has a side wall 142 and a lower surface 144. The side wall 142 of the bonding alignment mark 140 contacts the protection layer 150 (also referring to FIG. 4A), and the composite structure of the second intermediate layer M2 contacts the lower surface 144 of the corresponding bonding alignment mark. In addition, as shown in FIG. 8, the cutting alignment mark 140A disposed between two adjacent touch panels 100. The cutting alignment mark 140A has a side wall and a lower surface as well as the bonding alignment mark 140. The side wall of the cutting alignment mark 140A contacts the protection layer 150, and the composite structure of the second intermediate layer M2 contacts the lower surface of the corresponding cutting alignment mark 140A. The second intermediate layer M2 is located between the cutting alignment mark 140A and the substrate 110. The structure of the marks 140B-140E may refer to the above content of the cutting alignment mark 140A.

In some embodiments of this disclosure, the substrate 110 is preferably a transparent substrate. In more specific, the substrate 110 may be a rigid transparent substrate or a flexible transparent substrate, which can be made of a material selecting from glass, polymethylmethacrylate (PMMA), polyvinyl chloride (PVC), polypropylene (PP), polyethylene terephthalate (PET), polyethylene naphthalate (PEN), polycarbonate (PC), polystyrene (PS), and the likes. In order to increase the adhesive force between the substrate 110 and the metal nanowires, the substrate 110 is preferably treated with a preprocess step (e.g. a surface modification process), or an additional adhesive layer or resin layer can be applied on the surface of the substrate 110.

In the embodiment of this disclosure, the ink/slurry containing metal nanowires further comprises a dispersion or solvent such as water, alcohol, ketone, ether, hydrocarbon, or aromatic solvent (benzene, toluene, xylene, etc.). The above dispersion/solvent may also includes additives, surfactants, or adhesives such as carboxymethyl cellulose (CMC), 2-hydroxyethyl cellulose (HEC), hydroxypropyl methylcellulose (HPMC), sulfonates, sulfates, disulfonates, sulfosuccinates, phosphate esters, or fluorochemical surfactants, or the like. In some embodiments of the present disclosure, the metal nanowires may be silver nanowires or copper nanowires, which may have an average diameter of about 20 to 100 nanometers and an average length of about 20 to 100 micrometers. Preferably, the metal nanowires have an average diameter of about 20 to 70 nanometers and an average length of about 20 to 70 micrometers (i.e., an aspect ratio about of 1000). In some embodiments, the metal nanowires may have a diameter of 70 to 80 nanometers and a length of about 8 micrometers.

In some embodiments of the present disclosure, the film layer 130 is formed of an insulation material. For example, the material of the film layer 130 may be a non-conductive resin or other organic materials. In some embodiments of the present disclosure, the film layer 130 may be formed by spin coating, spray coating, printing, or the likes. In some embodiments, the thickness of the film layer 130 is about 20 nanometers to 10 micrometers, 50 nanometers to 200 nanometers, or 30 to 100 nanometers. For example, the thickness of the film layer 130 may be about 90 nanometers or 100 nanometers.

The roll-to-roll production line can adjust the sequence of multiple processing steps along the moving path of the substrate or can incorporate any desired additional machines/working stations as required. For example, pressure rollers or plasma equipment/stations can be installed in the production line to achieve an appropriate post-treatments or pre-treatments.

In some embodiments, the formed metal nanowires layer or the composite layer of nanowires and the film layer may be further treated to improve the conductivity thereof, and the post-treatment may be heating, plasma, corona discharge, UV ozone, pressure, or a combination of the above process steps. For example, after the step of curing the metal nanowire layer, one or more roller can be used to apply pressure thereto. In one embodiment, a pressure of about 50 to 3400 psi can be applied to the metal nanowire layer by one or more rollers. Preferably, a pressure of about 100 to 1000 psi, about 200 to 800 psi, or about 300 to 500 psi may be applied. The above-mentioned pressure applying step is preferably performed before the step of coating the film layer 130. In some embodiments, the post-treatments of applying both heat and pressure may be performed. In more detailed, the formed metal nanowires may be subjected to pressure via one or more rollers as mentioned above, and heated at the same time. For example, the roller can provide a pressure of about 10 to 500 psi, preferably about 40 to 100 psi, and the roller is heated to between about 70° C. and 200° C., and preferably to about 100° C. and 175° C. The post-treatments increases the conductivity of the metal nanowires. In some embodiments, the metal nanowires may be preferably exposed to a reducing agent for post-treatment. For example, the conductor including silver nanowires may be preferably exposed to a silver reducing agent for post-treatment. The silver reducing agent includes hydroboration (e.g. sodium borohydride), boron nitrogen compounds (e.g. dimethylaminoborane (DMAB)), or gas reducing agents (e.g. hydrogen ($H_2$)). The exposure time is about 10 seconds to about 30 minutes, and preferably about 1 minute to about 10 minutes.

The details of this embodiment can be referred to the above embodiments, so the detailed descriptions thereof will be omitted.

The structures/forming method of different embodiments of the present disclosure can be applied to each other or combined, and the disclosure is not limited to the above-mentioned specific embodiments.

In some embodiments of the present disclosure, the lower surfaces of the peripheral traces and/or the marks are covered by the first or second intermediate layers formed by the metal nanowires. This configuration can avoid the space reserved for the deviation in alignment process, so that the width of the peripheral area can be effectively reduced to form slim/ultra-slim border devices.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A touch panel, comprising:
 a substrate;
 a plurality of peripheral traces disposed in a peripheral area of the substrate, wherein the peripheral traces are conductive from first sidewalls of the peripheral traces to second sidewalls of the peripheral traces;
 a plurality of first intermediate layers, wherein the first intermediate layers are disposed between the peripheral traces and the substrate, and each of the first intermediate layers comprises a composite structure comprising metal nanowires and a film layer, wherein the first sidewalls of the peripheral traces and first sidewalls of the first intermediate layers are co-planar; and a touch sensing electrode disposed in a display area of the substrate and electrically connected with the peripheral traces.

2. The touch panel according to claim 1, further comprising:
a film layer covering the touch sensing electrode and the peripheral traces.

3. The touch panel according to claim 2, further comprising:
a first non-conductive area disposed in the display area and a second non-conductive area disposed in the peripheral area.

4. The touch panel according to claim 3, wherein the first non-conductive area and the second non-conductive area comprise a filler made of the same material as the film layer.

5. The touch panel according to claim 4, wherein the second non-conductive area is defined between adjacent peripheral traces of the peripheral traces, each of the peripheral traces has a lower surface, the first sidewalls of the first intermediate layers and the first sidewalls of the peripheral traces contact the filler, and each of the first intermediate layers is formed between the lower surface of a corresponding peripheral trace of the peripheral traces and the substrate.

6. The touch panel according to claim 2, wherein the first sidewalls of the peripheral traces and first sidewalls of the first intermediate layers are in contact with the film layer.

7. The touch panel according to claim 1, further comprising:
a first non-conductive area disposed in the display area and a second non-conductive area disposed in the peripheral area.

8. The touch panel according to claim 7, wherein the first non-conductive area and the second non-conductive area comprise a filler made of the same material as the film layer, and the filler is substantially free of the metal nanowires.

9. The touch panel according to claim 8, further comprising:
a protective layer covering the touch sensing electrode and the peripheral traces.

10. The touch panel according to claim 9, wherein the second non-conductive area is defined between adjacent peripheral traces of the peripheral traces, each of the peripheral traces has a lower surface, the first sidewalls of the peripheral traces contacted the protective layer, the first sidewalls of the first intermediate layers contacted the filler, and the composite structure of each of the first intermediate layers is disposed between the lower surface of a corresponding peripheral trace of the peripheral traces and the substrate.

11. The touch panel according to claim 1, wherein a width of the peripheral traces is about 5 μm to 20 μm, and a distance between adjacent peripheral traces of the peripheral traces is about 5 μm to 20 μm.

12. The touch panel according to claim 1, wherein the peripheral traces are made of at least one metal material, and the touch sensing electrode comprises the metal nanowires or the composite structure comprising the film layer and the metal nanowires.

13. The touch panel according to claim 1, wherein the second sidewalls of the peripheral traces and second sidewalls of the first intermediate layers are co-planar.

14. The touch panel according to claim 1, comprising:
a film layer; and
a protective layer over the film layer, wherein the first sidewalls of the first intermediate layers are in contact with the film layer and the first sidewalls of the peripheral traces are in contact with the protective layer.

15. The touch panel according to claim 1, wherein each of the first intermediate layers consists of a metal.

16. A sheet of touch sensors, comprising:
a substrate, wherein a plurality of touch panels are disposed on the substrate, and each of the touch panels comprises:
a plurality of peripheral traces disposed in a peripheral area, wherein the peripheral traces are conductive from first sidewalls of the peripheral traces to second sidewalls of the peripheral traces, and each of the peripheral traces are a nontransparent metal structure;
a plurality of first intermediate layers each disposed between a corresponding peripheral trace of the peripheral traces and the substrate, wherein each of the first intermediate layers comprises a composite structure comprising metal nanowires and a film layer, wherein the first sidewalls of the peripheral traces and first sidewalls of the first intermediate layers are co-planar; and
a touch sensing electrode disposed in a display area, wherein the touch sensing electrode is electrically connected with the peripheral traces.

17. The sheet according to claim 16, further comprising:
a film layer covering the touch sensing electrode and the peripheral traces.

18. The sheet according to claim 17, further comprising:
a plurality of first non-conductive areas disposed in the display area and a plurality of second non-conductive areas disposed in the peripheral area.

19. The sheet according to claim 18, wherein the first non-conductive areas and the second non-conductive areas comprise a filler made of the same material as the film layer.

20. The sheet according to claim 19, wherein each of the second non-conductive areas is defined between adjacent peripheral traces of the peripheral traces, each of the peripheral traces has a lower surface, the first sidewalls of the first intermediate layers and the first sidewalls of the peripheral traces contact the filler, and each of the first intermediate layers is formed between the lower surface of the corresponding peripheral trace of the peripheral traces and the substrate.

21. The sheet according to claim 16, further comprising:
a plurality of first non-conductive areas disposed in the display area and a plurality of second non-conductive areas disposed in the peripheral area.

22. The sheet according to claim 21, wherein the first non-conductive areas and the second non-conductive areas comprise a filler made of the same material as the film layer, and the filler does not comprise the metal nanowires.

23. The sheet according to claim 22, further comprising:
a protective layer covering the touch sensing electrode and the peripheral traces.

24. The sheet according to claim 23, wherein each of the second non-conductive areas is defined between adjacent peripheral traces of the peripheral traces, each of the peripheral traces has a lower surface, the first sidewalls of the peripheral traces contacted the protective layer, and the composite structure of the each of the first intermediate layers is disposed between the lower surface of the corresponding peripheral trace of the peripheral traces and the substrate.

25. The sheet according to claim 16, wherein a width of the peripheral traces is about 5 μm to about 20 μm, and a distance between adjacent peripheral traces of the peripheral traces is about 5 μm to about 20 μm.

26. The sheet according to claim 16, wherein the peripheral traces are made of metal materials, and the touch sensing electrode comprises the metal nanowires or the composite structure comprising the film layer and the metal nanowires.

27. A touch panel, comprising:
a substrate;
a plurality of peripheral traces disposed in a peripheral area of the substrate, wherein a width of the peripheral traces is about 5 µm to 20 µm, and a distance between adjacent peripheral traces of the plurality of peripheral traces is about 5 µm to 20 µm;
a plurality of marks disposed in the peripheral area, wherein the peripheral traces and the marks are a nontransparent metal structure;
a plurality of first intermediate layers and a plurality of second intermediate layers, wherein the first intermediate layers are disposed between the peripheral traces and the substrate, the second intermediate layers are disposed between the marks and the substrate, and each of the first intermediate layers and each of the second intermediate layers comprises metal nanowires; and
a touch sensing electrode disposed in a display area of the substrate and electrically connected with the peripheral traces.

28. The touch panel according to claim 27, further comprising:
a film layer covering the touch sensing electrode, the peripheral traces, and the marks.

29. The touch panel according to claim 28, further comprising:
a first non-conductive area disposed in the display area and a second non-conductive area disposed in the peripheral area.

30. The touch panel according to claim 29, wherein the first non-conductive area and the second non-conductive area comprise a filler made of the same material as the film layer.

31. The touch panel according to claim 30, wherein the second non-conductive area is defined between adjacent peripheral traces of the peripheral traces, each of the peripheral traces has a sidewall and a lower surface, each of the first intermediate layers has a sidewall, the sidewalls of the first intermediate layers and the sidewalls of the peripheral traces contact the filler, and each of the first intermediate layers is disposed between the lower surface of a corresponding peripheral trace of the peripheral traces and the substrate.

32. The touch panel according to claim 30, wherein the second non-conductive area is defined between adjacent marks of the marks, each of the marks has a sidewall and a lower surface, each of the second intermediate layers has a sidewall, the sidewalls of the second intermediate layers and the sidewalls of the peripheral traces contact the filler, and each of the second intermediate layers is disposed between the lower surface of the a corresponding mark of the marks and the substrate.

33. The touch panel according to claim 27, wherein each of the first intermediate layers and each of the second intermediate layers is a composite structure comprising the metal nanowires and a film layer.

34. The touch panel according to claim 33, further comprising:
a first non-conductive area disposed in the display area and a second non-conductive area disposed in the peripheral area.

35. The touch panel according to claim 34, wherein the first non-conductive area and the second non-conductive area comprise a filler made of the same material as the film layer, and the filler is substantially free of the metal nanowires.

* * * * *